(12) United States Patent
Panzarella et al.

(10) Patent No.: US 7,845,703 B2
(45) Date of Patent: Dec. 7, 2010

(54) SEATING SYSTEMS FOR MOTOR VEHICLES

(75) Inventors: Thomas A. Panzarella, Harleysville, PA (US); Thomas A. Panzarella, Jr., Conshohocken, PA (US); David D. McClanahan, Harleysville, PA (US); James B. Eldon, III, Barto, PA (US); Ira C. Hoffman, Philadelphia, PA (US); Michael T. Martin, Pennsburg, PA (US)

(73) Assignee: Freedom Sciences, LLC, Philadelphia, PA (US)

( * ) Notice: Subject to any disclaimer, the term of this patent is extended or adjusted under 35 U.S.C. 154(b) by 166 days.

(21) Appl. No.: 12/026,216

(22) Filed: Feb. 5, 2008

(65) Prior Publication Data
US 2008/0185229 A1    Aug. 7, 2008

Related U.S. Application Data

(60) Provisional application No. 60/947,748, filed on Jul. 3, 2007, provisional application No. 60/900,001, filed on Feb. 6, 2007.

(51) Int. Cl.
*B60N 2/06* (2006.01)
(52) U.S. Cl. .............................. 296/65.11; 297/344.24
(58) Field of Classification Search .............. 296/65.11, 296/65.12, 65.01, 65.13–65.15; 297/423.2, 297/344.24
See application file for complete search history.

(56) References Cited

U.S. PATENT DOCUMENTS

| | | | |
|---|---|---|---|
| 3,052,443 A * | 9/1962 | Lagstrom | .................... 248/430 |
| 4,155,587 A | 5/1979 | Mitchell | |
| 5,018,696 A | 5/1991 | Siegrist | |
| 5,524,952 A | 6/1996 | Czech et al. | |
| 5,769,480 A | 6/1998 | Gebhardt | |
| 6,113,175 A | 9/2000 | Guim et al. | |
| 6,155,363 A * | 12/2000 | Matsumoto et al. | ........ 180/9.34 |
| 6,543,848 B1 | 4/2003 | Suga et al. | |
| 6,659,562 B2 | 12/2003 | Uchiyama | |
| 6,821,078 B2 | 11/2004 | Dudai et al. | |
| 6,837,666 B1 | 1/2005 | Panzarella et al. | |
| 6,962,383 B2 * | 11/2005 | Takenoshita et al. | ..... 296/65.03 |
| 7,108,466 B2 | 9/2006 | Panzarella et al. | |

FOREIGN PATENT DOCUMENTS

GB       2069969 A       9/1981

(Continued)

OTHER PUBLICATIONS

PCT International Search Report issued Jun. 12, 2008 for corresponding PCT/US2008/001494 application.

(Continued)

*Primary Examiner*—Glenn Dayoan
*Assistant Examiner*—Melissa A Black
(74) *Attorney, Agent, or Firm*—Fox Rothschild LLP

(57) ABSTRACT

Embodiments of seating systems for motor vehicles facilitate two-dimensional movement of a seat in a horizontal plane. The seating systems can also facilitate vertical movement of the seat. The seating systems are motorized, and can be automatically controlled so that minimal movement and effort are required on the part of the user to enter and exit the vehicle.

22 Claims, 27 Drawing Sheets

FOREIGN PATENT DOCUMENTS

| | | | |
|---|---|---|---|
| JP | 60-92752 | A | 5/1985 |
| JP | 09183325 | A | 7/1997 |
| JP | 10315825 | A | 12/1998 |
| JP | 11208331 | A | 3/1999 |
| WO | 99/11488 | | 3/1999 |

OTHER PUBLICATIONS

Richard A. Keller of Bruno Independent Living Aids, Inc. (Author), correspondence to Frank T. Carroll, Esq. dated Nov. 4, 2009. US.

Bev, Lätt och bekvämt! TURNY: brochure in Swedish, date code 9803 (Mar. 1998); illustration of second row Turny seat transfer track. SE.

Bev, product photographs showing the installation of the Turny seat using the transfer tracks to movie horizontally from the first row driving position to the second row transfer position in a minivan. SE.

Bev North America, brochure in English illustrating the second row Turny seat transfer tracks. CA.

Bruno, TAS Dealer News, newsletter release dated Feb. 4, 2003. US.

\* cited by examiner

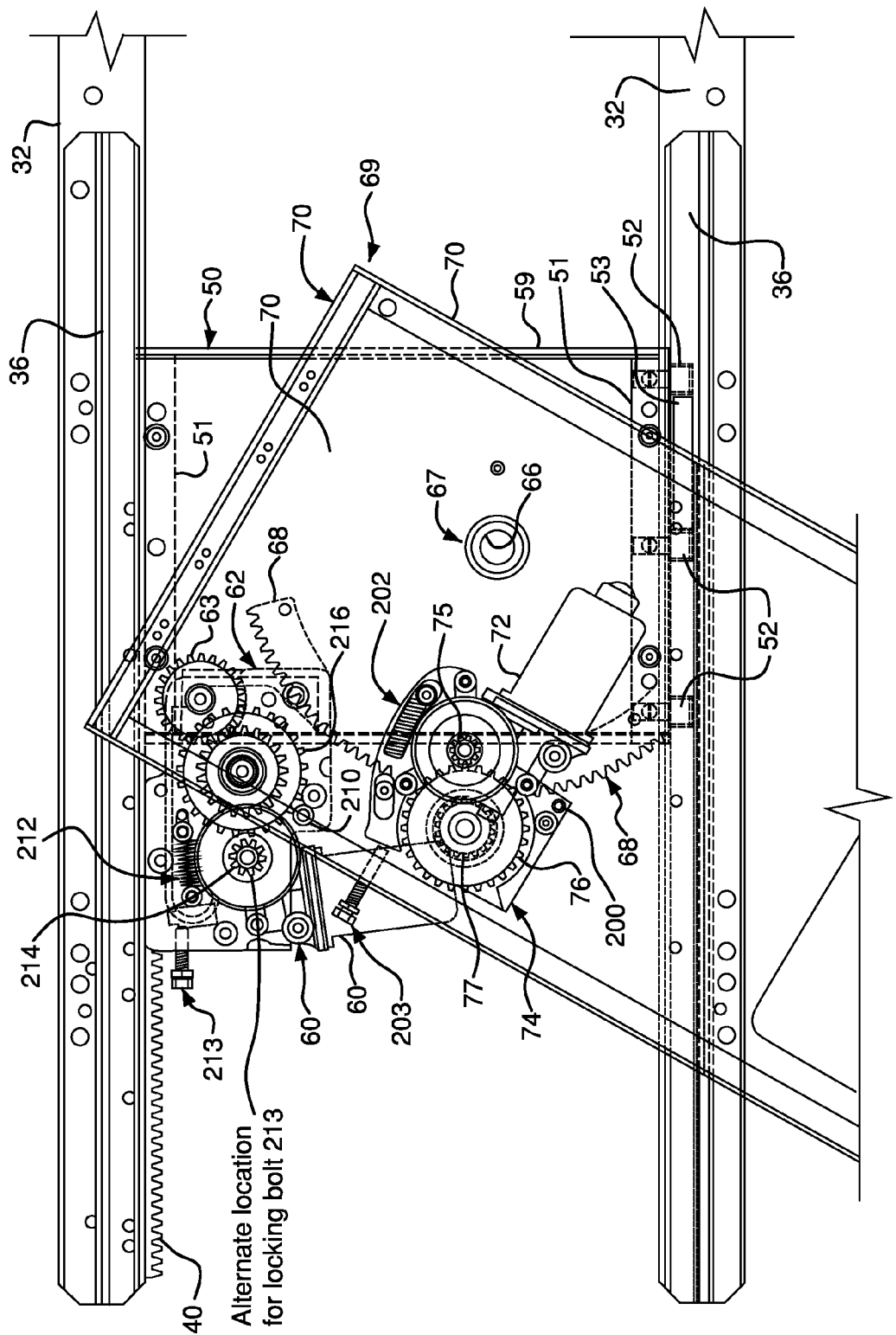

Possible locations for system 10

SEATING SYSTEMS FOR MOTOR VEHICLES

CROSS-REFERENCE TO RELATED APPLICATIONS

This application claims the benefit under 35 U.S.C. §119(e) to U.S. provisional application No. 60/900,001, filed Feb. 6, 2007; and U.S. provisional application No. 60/947,748, filed Jul. 3, 2007. The contents of these applications are incorporated by reference herein in their entireties.

TECHNICAL FIELD

The present embodiments relate to seats for use in motor vehicles such as, but not limited to automobiles, vans, pickup trucks, and buses. The seats articulate to assist mobility-impaired individuals in entering and exiting the motor vehicles.

BACKGROUND

Mobility-impaired individuals are often transported in motor vehicles while the individual is seated in a power chair or other personal-transportation vehicle. Transporting an individual in this manner, however, presents various disadvantages. For example, extensive structural modifications to the motor vehicle are usually required to accommodate the mobility-impaired individual and the power chair. The required modifications can include lowering the floor of the motor vehicle, raising the vehicle's roof, etc. Modifying a motor vehicle in this manner can generate a considerable expense to the vehicle's owner or user. Moreover, because the motor vehicle undergoes specialized structural modifications, its open market resale value can be dramatically reduced. In some cases, the resale value may be reduced to zero due to the absence of a sizable market for such "handicapped-modified" vehicles.

Moreover, the current procedures may not provide the thirty mile per hour frontal crash protection provided by most, if not all original equipment manufacturer (OEM) automotive seats. In particular, power chairs are not designed or constructed to withstand the 18-20 g impact loads created during standard automotive crash tests, and subjecting a power chair to such loads will cause the seat back of the chair to fail in virtually all cases.

A need therefore exists for a motor-vehicle seat that accommodates a mobility-impaired user and permits the user to enter and exit the motor vehicle with minimal movement and effort, while meeting the applicable crashworthiness requirements.

SUMMARY

Embodiments of seating systems for motor vehicles facilitate two-dimensional movement of a seat in a horizontal plane. The seating systems can also facilitate vertical movement of the seat. The seating systems are motorized, and can be automatically controlled so that minimal movement and effort are required on the part of the user to enter and exit the vehicle. The seating systems can include a docking mechanism that secures the seat in position within the motor vehicle in a crashworthy manner.

Embodiments of seating systems comprise a frame mountable on a mounting surface within a motor vehicle; a carriage assembly mounted on the frame and translating linearly in relation to the frame; a base assembly mounted on the carriage assembly and rotating in relation to the carriage assembly; a trolley assembly mounted on the base assembly and translating linearly in relation to the base assembly; and a seat mounted on the trolley assembly.

BRIEF DESCRIPTION OF THE DRAWINGS

The foregoing summary, as well as the following detailed description of preferred embodiments, are better understood when read in conjunction with the appended drawings. The drawings are presented for illustrative purposes only, and the scope of the appended claims is not limited to the specific embodiments shown in the drawings. In the drawings:

FIG. 5 is a front view of the system shown in FIGS. 1A-3, with the seat of the system removed for purposes of illustration and a base assembly of the system in a partially-rotated position;

DETAILED DESCRIPTION

The figures depict an embodiment of an articulating seat system 10. The system 10 can be used in a motor vehicle 12. The motor vehicle 10 is depicted in FIGS. 2-4 and 19. The motor vehicle 12 can be, for example, an automobile, a van, a pickup truck, a bus, etc.

The system 10 includes a seat 14. The OEM seat of the motor vehicle 12 can be used as the seat 14, after any required modifications have been made thereto to permit the OEM seat to interface with the remainder of the system 10. Alternatively, an aftermarket seat can be used as the seat 14, after being modified as required to permit the aftermarket seat to interface with the remainder of the system 10.

The system 10 is configured to move the seat 14 between positions inside and outside of the motor vehicle 12, so that the individual using the seat 14 can enter and exit the motor vehicle 12 with minimal effort and movement. The seat 14 can be used, for example, to assist a mobility-impaired individual in transferring between the seat 14 and a power chair, wheelchair, scooter, ultra-light, etc. positioned next to the motor vehicle 12.

Figure 1A:
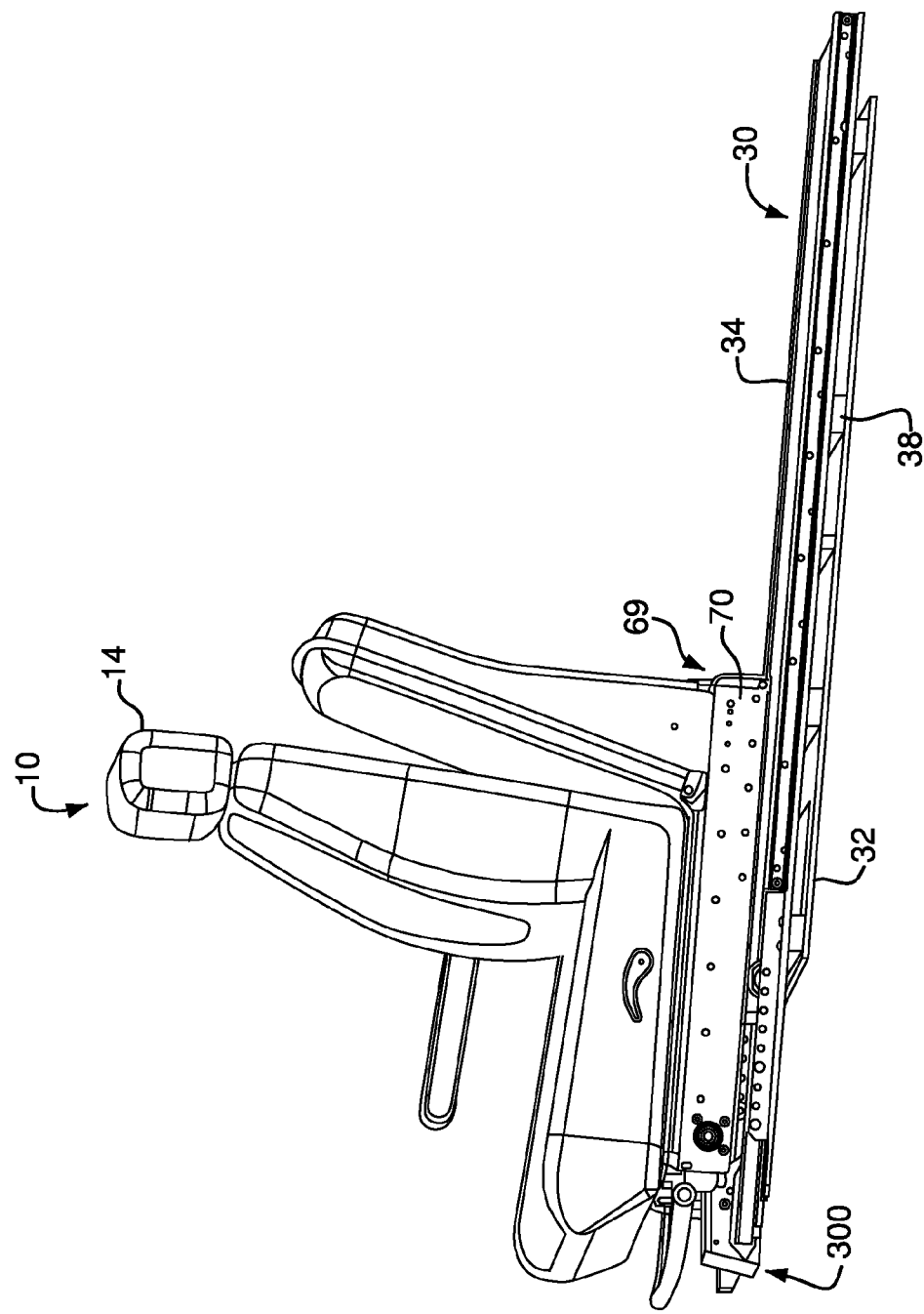
FIG. 1A is a side perspective view of an embodiment of an articulating seat system, depicting a seat of the system in a forward, docked position.
Figure 1B:
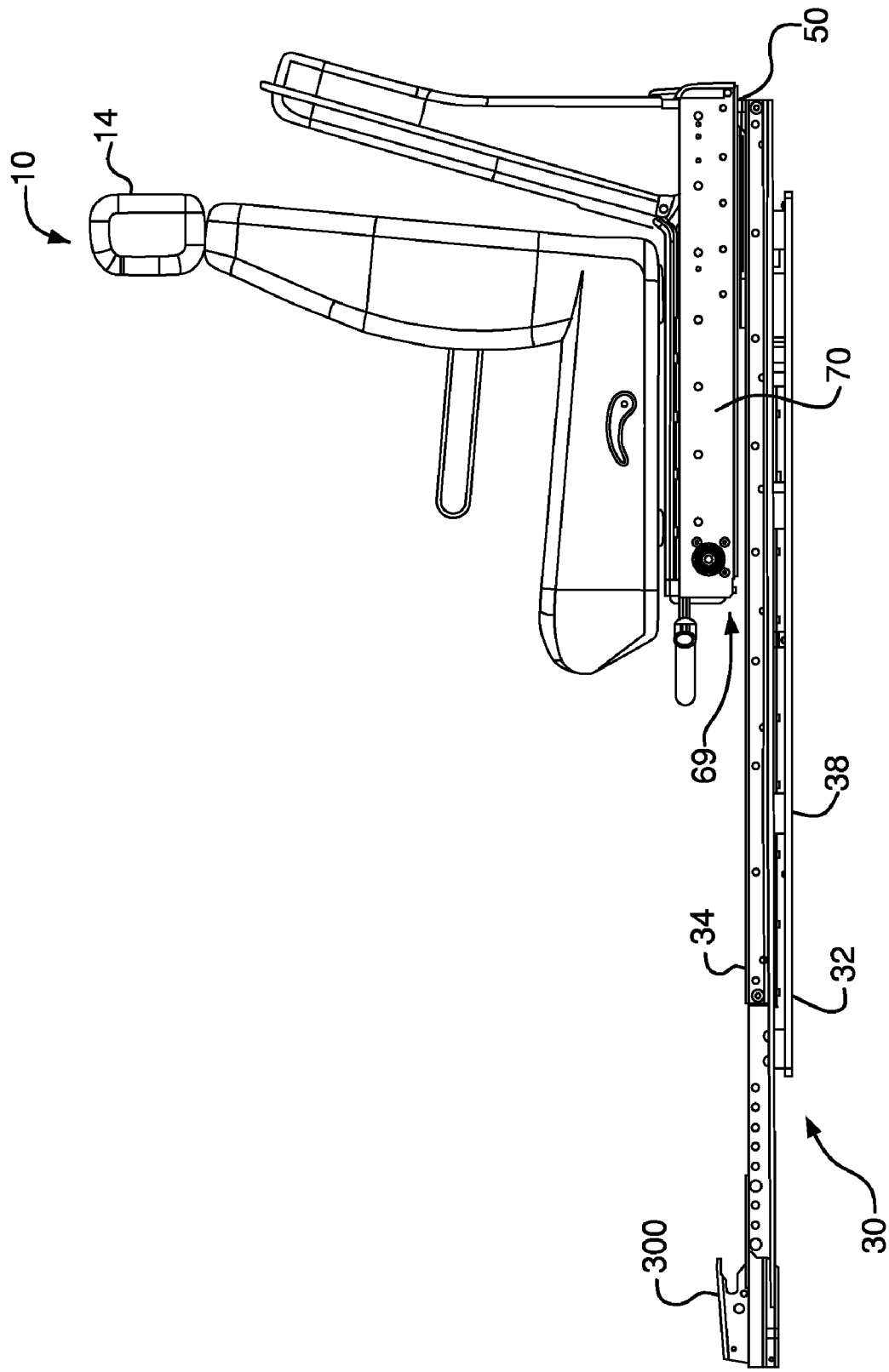
FIG. 1B is a side view of the system shown in FIG. 1A, depicting the seat in a rearward, undocked position.
Figure 2:
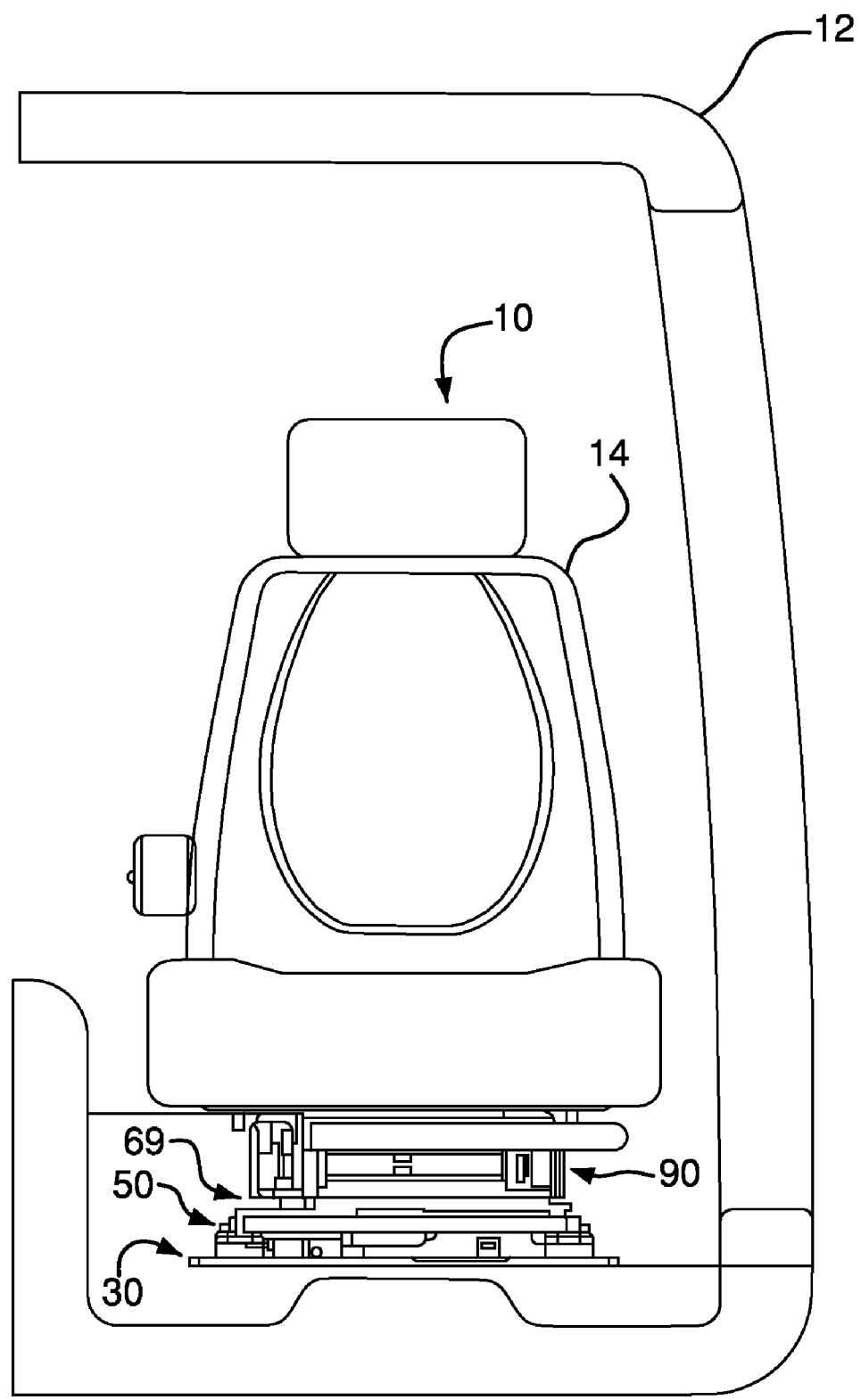
FIG. 2 is a side view of the system shown in FIGS. 1A and 1B installed in a motorized vehicle, depicting the seat in a rearward position and rotated approximately ninety degrees from the position depicted in FIG. 1B.
Figure 3:
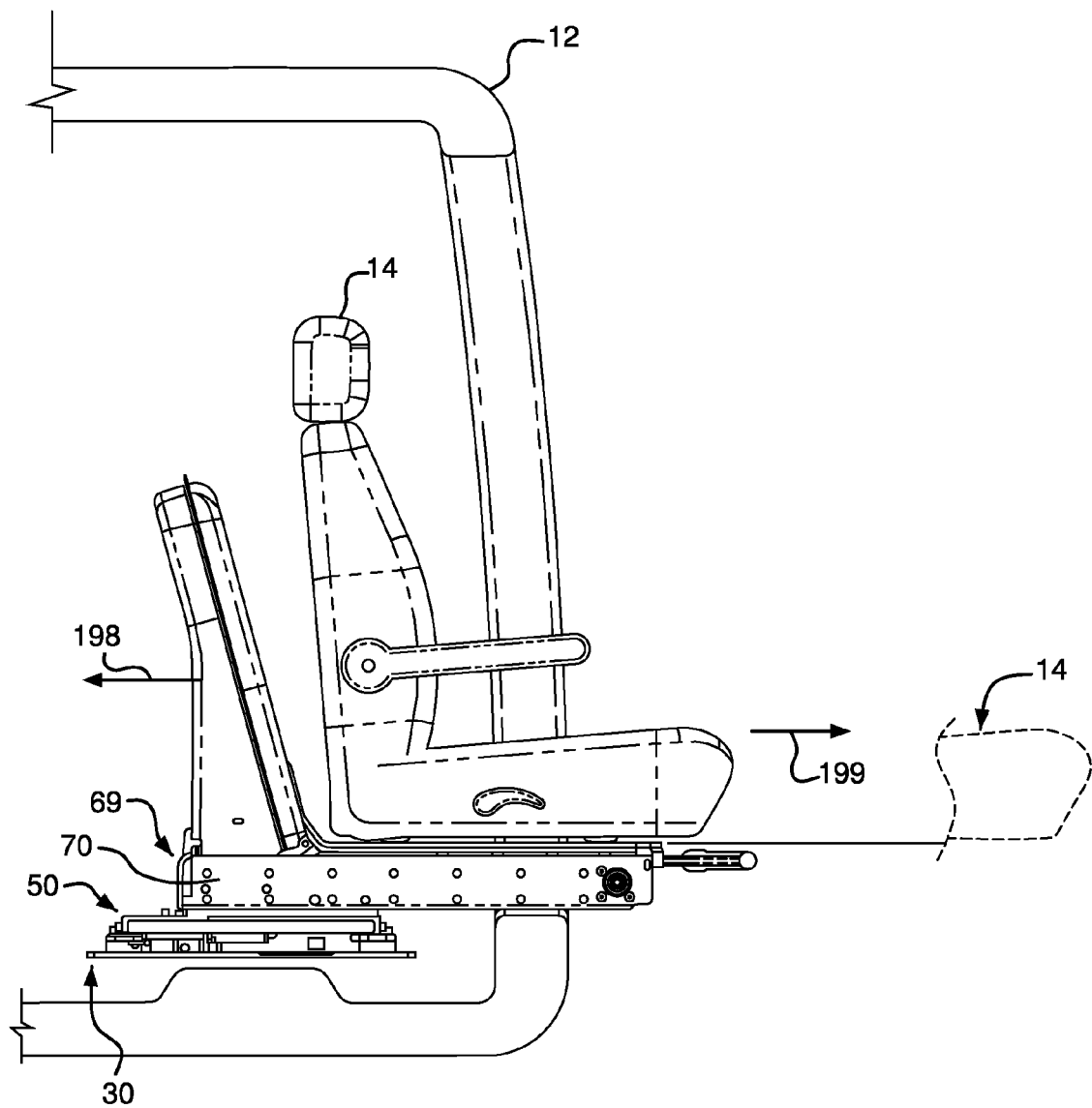
FIG. 3 is a front view of the system shown in FIGS. 1A-2, depicting the seat in the orientation depicted in FIG. 2 and exiting the motor vehicle.

The system 10 includes a mounting frame 30 comprising a base plate 32, as shown in FIGS. 1A and 1B. The base plate 32 is securely mounted on a floorboard or other suitable mounting surface of the motor vehicle 12, using a suitable means such as fasteners. The fasteners are accommodated by slots 33 formed in the base plate 32 and shown in FIG. 9. The use of multiple slots 33 provides the installer with flexibility in placing the base plate 32 at an optimal location on the mounting surface of the motor vehicle 12.

The mounting frame 30 also includes two track assemblies 36 mounted on opposing sides of the base plate 32 via spacers 38, as shown in FIGS. 1A, 1B, 7, and 8. One of the track assemblies 36 includes a traverse gear rack 40.

The system 10 also includes a carriage assembly 50 movably mounted on The mounting frame 30, as shown in FIG. 5. The carriage assembly 50 includes braces, side plates 51 secured to the braces, and bearings 52 mounted on the side plates 51 so that the bearings 52 can rotate in relation to the side plates 51. The bearings 52 are disposed within channels 53 defined by the track assemblies 36, so that the carriage assembly 50 can translate in relation to the mounting frame 30 by rolling on the bearings 52. The carriage assembly 50, and the seat 14 mounted thereon, can translate linearly in a horizontal plane in relation to the mounting frame 30, between forward and rearward positions shown respectively in FIGS. 1A and 1B.

The carriage assembly 50 also includes a bearing plate 59, a traverse drive motor 60, and a traverse drive gearbox 62 driven by the traverse drive motor 60, as shown in FIG. 5. The traverse drive motor 60 and the traverse drive gearbox 62 are mounted on the bearing plate 59. A drive gear 63 of the traverse drive gearbox 62 engages the gear rack 40 so that activation of the traverse drive motor 60 causes the carriage assembly 50 to translate between the forward and rearward positions.

The carriage assembly 50 also includes a bearing shaft 66 mounted on the bearing plate 59, a bearing assembly 67 mounted on the bearing shaft 66, and an arcuate-shaped turnout rack 68 mounted on the bearing plate 59, as shown in FIG. 5.

The system 10 also comprises a base assembly 69, as shown in FIG. 5. The base assembly 69 includes a base pan 70. The base pan 70 is coupled to the bearing shaft 66 by way of the bearing assembly 67, so that the base pan 70 can rotate in relation to the bearing shaft 66 and the carriage assembly 50.

The base assembly 69 also includes a turnout motor 72 and a turnout gearbox 74 mounted on the base pan 70, as shown in FIG. 5. A spur gear 75 of the turnout motor 72 engages a drive gear 76 of the turnout gearbox 74. Rotation of the drive gear 76 rotates a spur gear 77 of the turnout gearbox 74. The spur gear 77 engages gears on the turnout rack 68 so that rotation of the spur gear 77 causes the turnout gearbox 74, the base pan 70, and the seat 14 to rotate in relation to the bearing plate 59 and the floorboard of the motor vehicle 12. This feature permits the seat 14 to be rotated between (i) a "non-rotated" position, shown in FIGS. 1A and 1B, suitable for use as the seat 14 traverses between its forward, upper and rearward, upper positions; and (ii) a "rotated" position, shown in FIGS. 3 and 4, suitable for moving the seat 14 into and out of the motor vehicle 12, and raising and lowering the seat 14.

Figure 7:
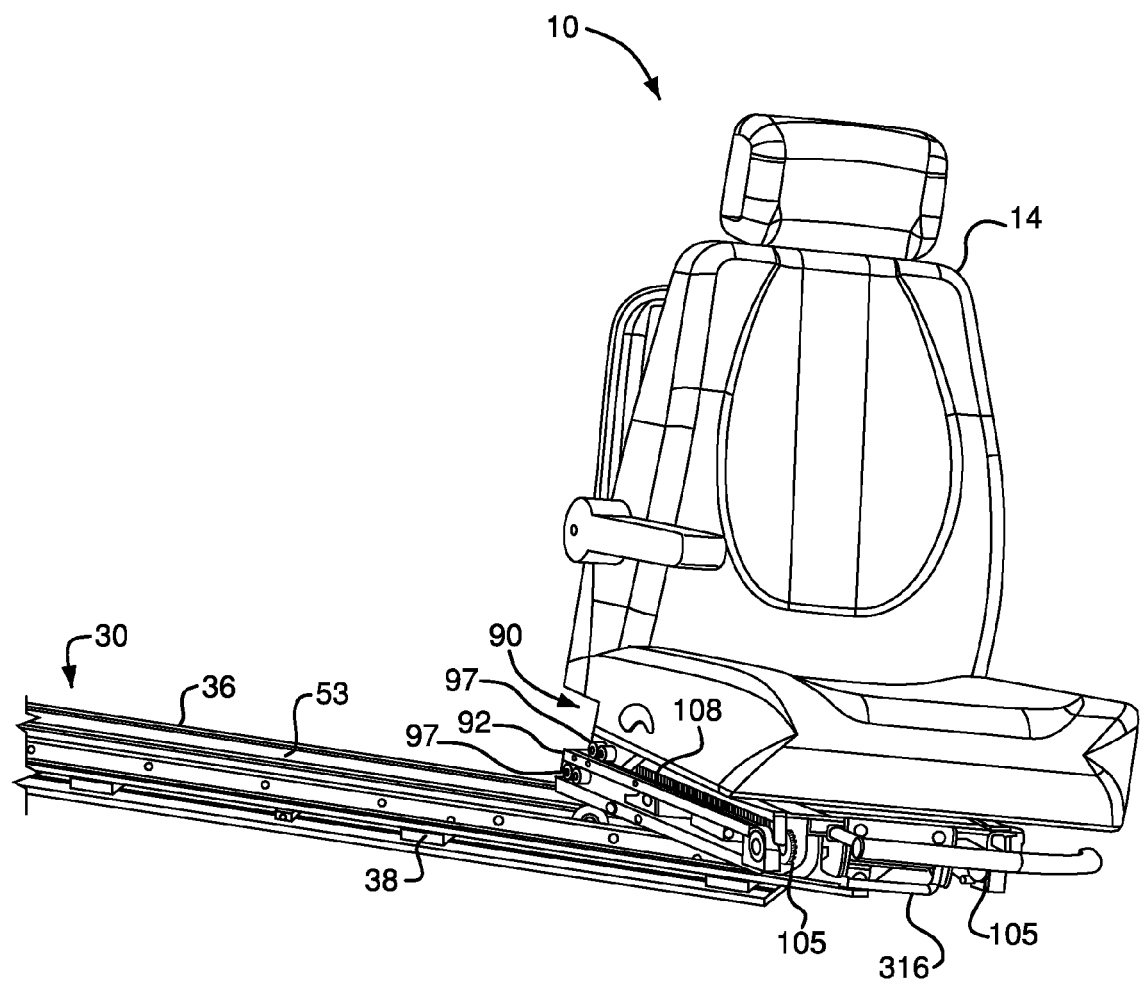
FIG. 7 is a side perspective view of the system shown in FIGS. 1A-5, depicting the seat of the system in its rearward, undocked position and rotated as depicted in FIGS. 2-4, and with a base pan of the system removed for purposes of illustration.
Figure 8:
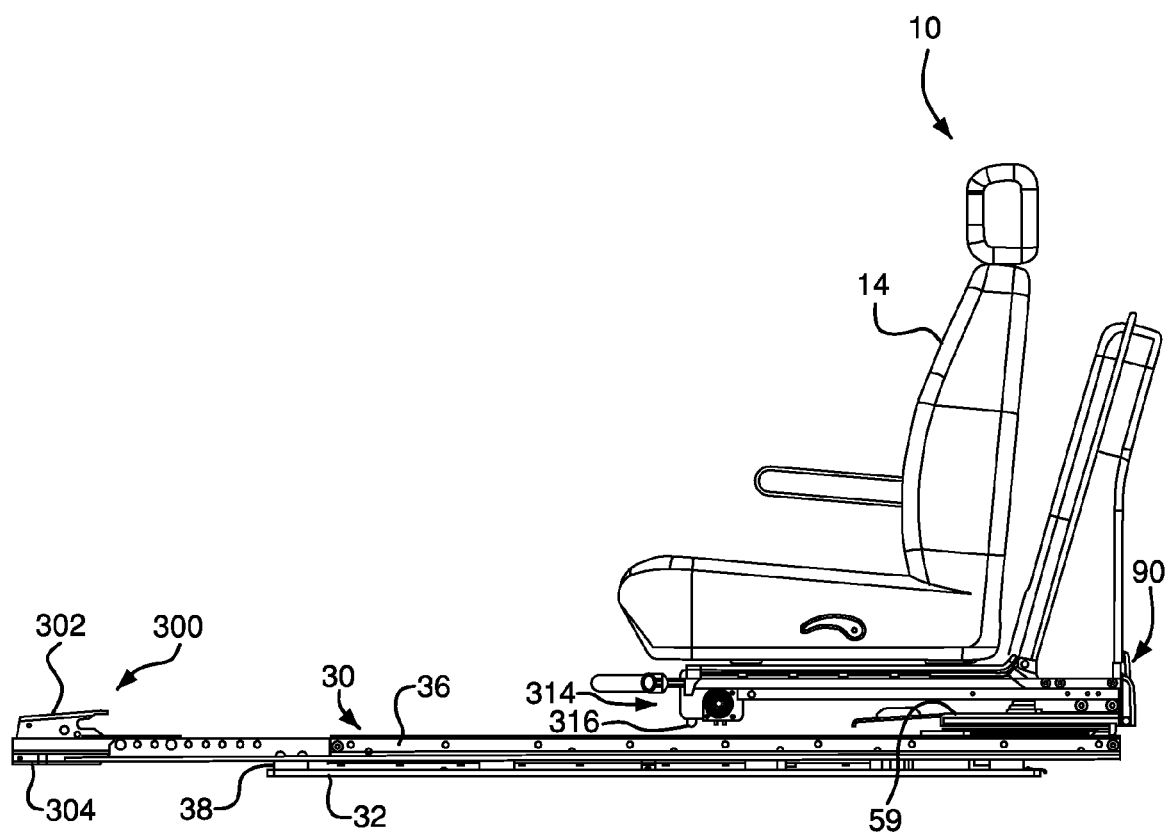
FIG. 8 is a side view of the system shown in FIGS. 1A-5 and 7, depicting the seat of the system in its rearward, undocked position, and with a base pan of the system removed for purposes of illustration.
Figure 9:
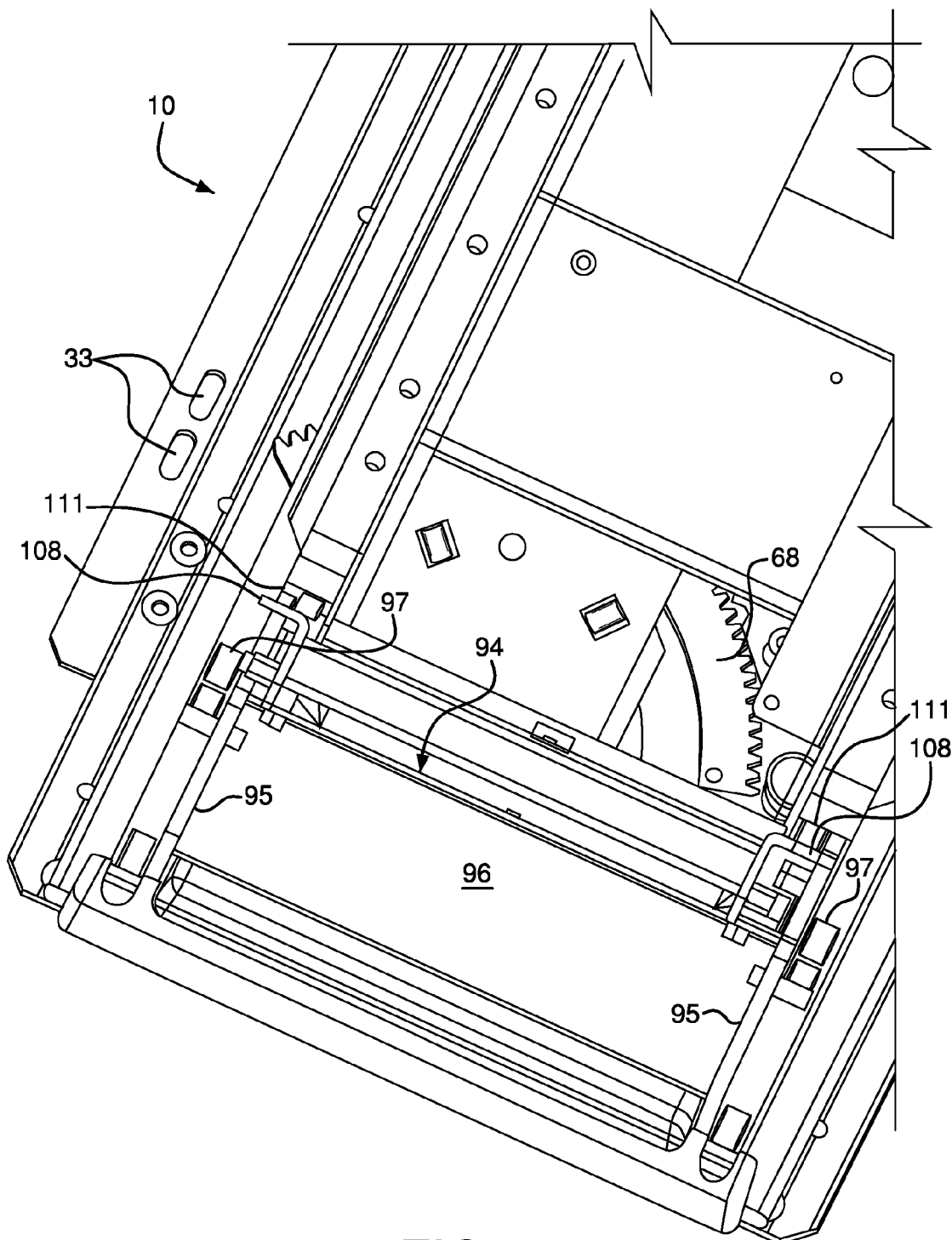
FIG. 9 is a top perspective view of the system shown in FIGS. 1A-5, 7, and 8, with the seat and a base assembly of the system removed for purposes of illustration.
Figure 10:
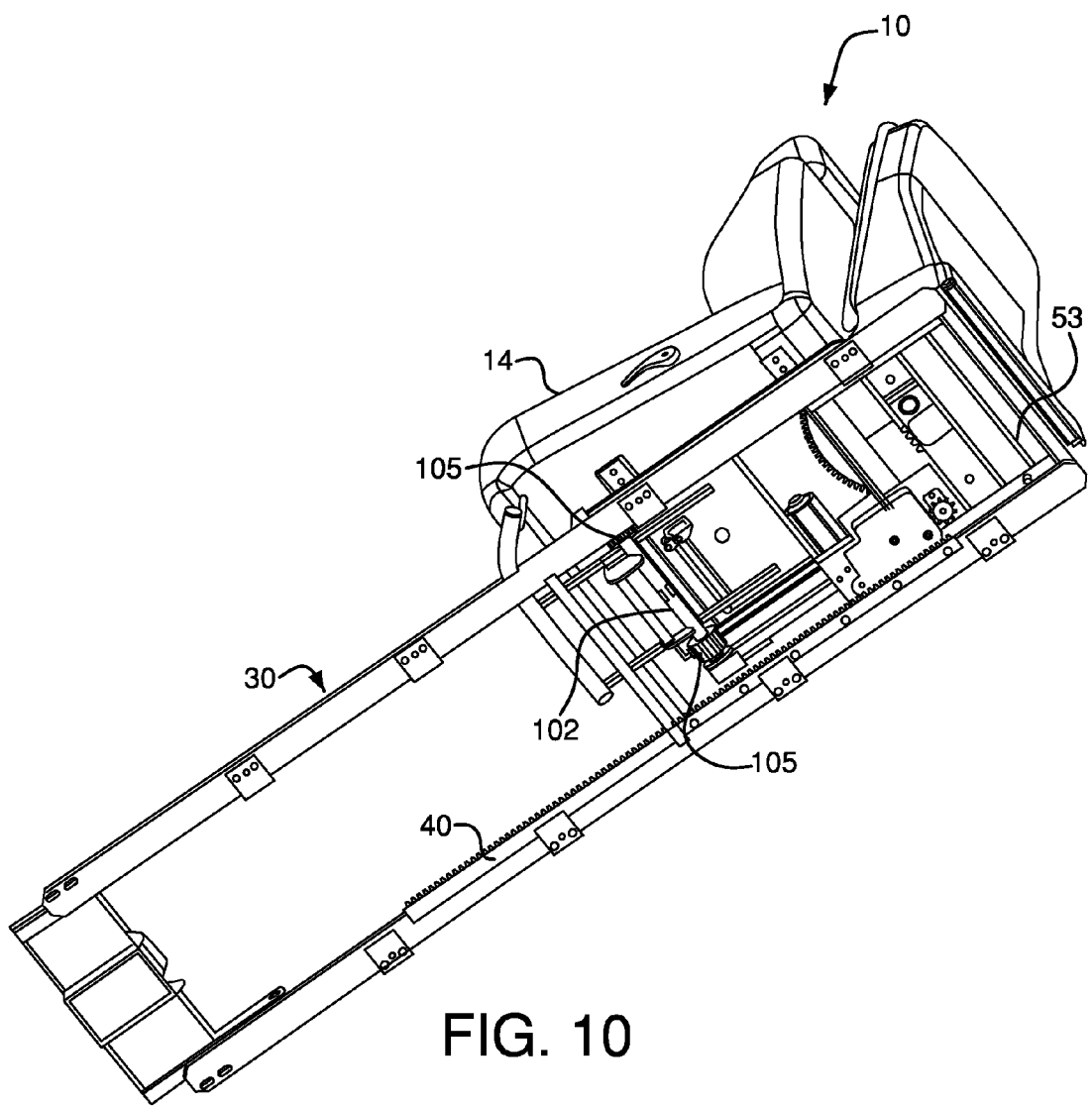
FIG. 10 is a bottom perspective view of the system shown in FIGS. 1A-5 and 7-9, depicting the seat in its rearward, undocked position.
Figure 11:
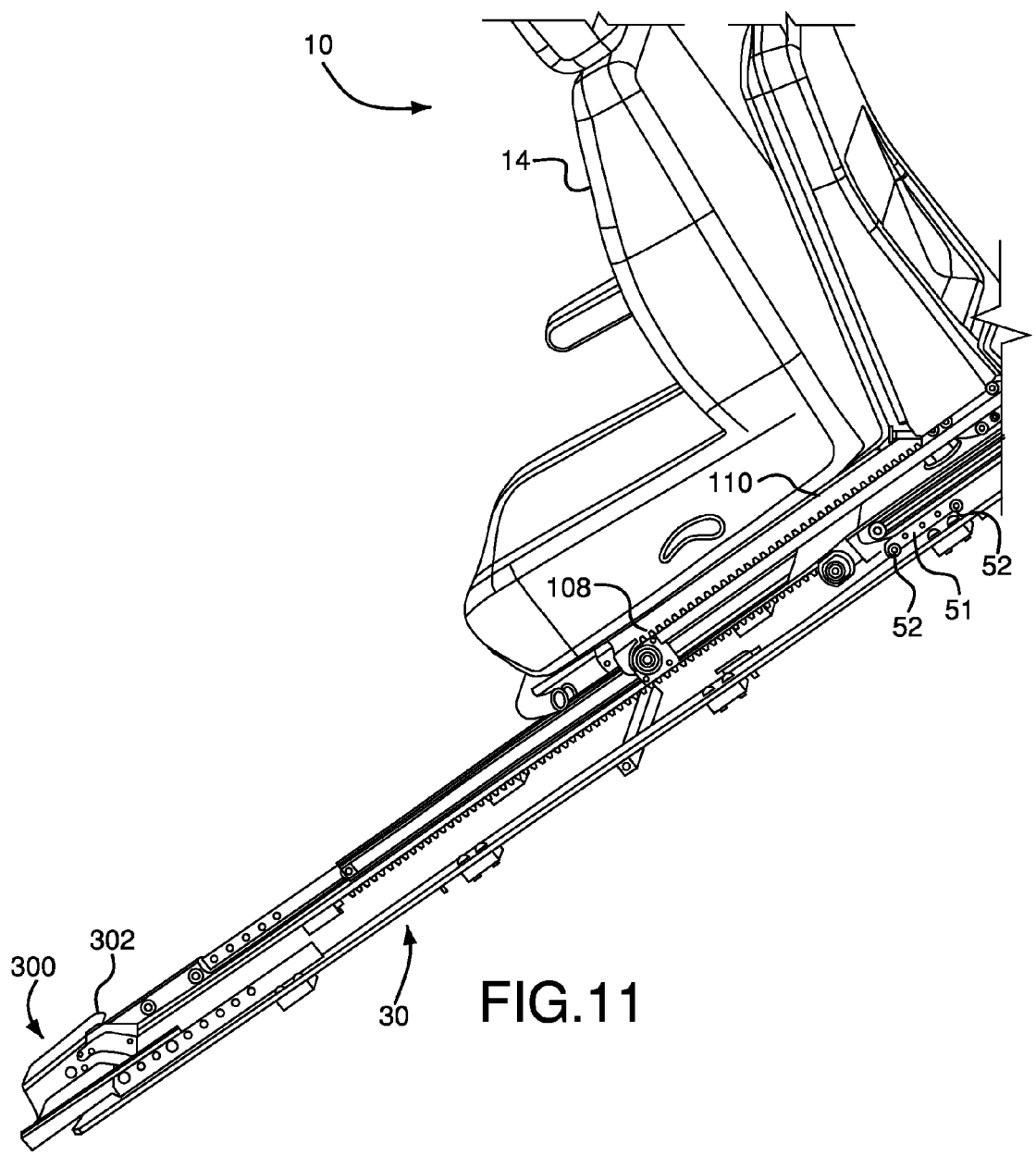
FIG. 11 is a side perspective view of the system shown in FIGS. 1A-5 and 7-10, depicting the seat in its rearward, undocked position, and with a base pan of the system removed for purposes of illustration.
Figure 12:
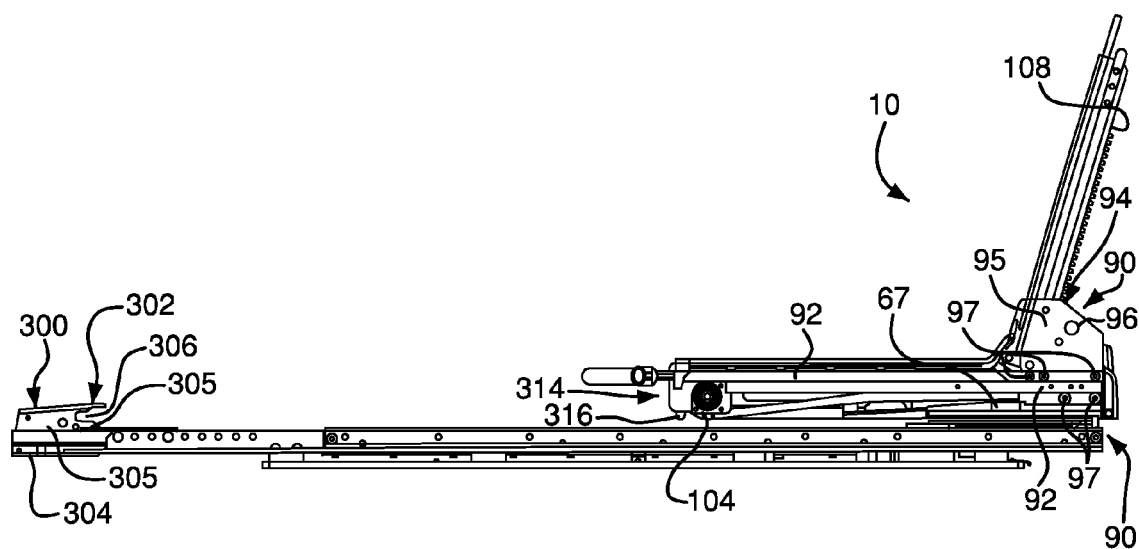
FIG. 12 is a side view of the system shown in FIGS. 1A-5 and 7-11, with the seat and base pan of the system removed and depicting a trolley assembly of the system in a rearward position.
Figure 13:
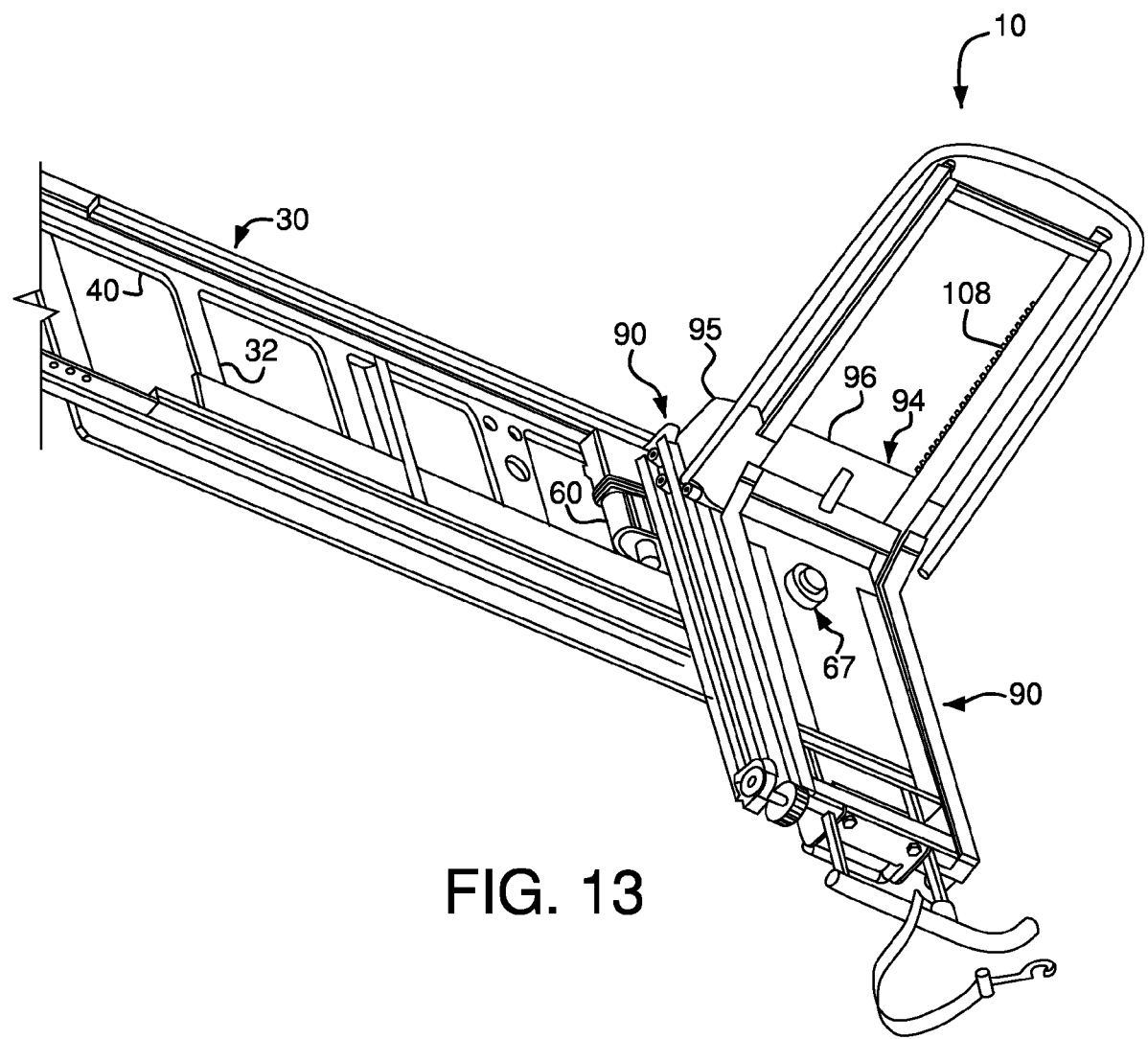
FIG. 13 is a top perspective view of the system shown in FIGS. 1A-5 and 7-12, with the seat of the system removed, and depicting the trolley assembly in a rearward position and rotated approximately ninety degrees from the position depicted in FIG. 12.

The system 10 also comprises a trolley assembly 90, shown in FIGS. 7, 9, and 12-14. The trolley assembly 90 includes trolley rails 92 secured to opposing sides of the base pan 70. The trolley assembly 90 also includes a trolley plate assembly 94. The trolley plate assembly 94 comprises two trolley plates 95, and a cross brace 96 disposed between, and secured to both of the trolley plates 95. The trolley plates are shown in FIGS. 12 and 13; the cross brace 96 is shown in FIGS. 9 and 13. The trolley plate assembly 94 is mounted on, and translates linearly in relation to the trolley rails 92 by way of bearings 97 mounted on the trolley plate assembly 94 as shown in FIGS. 7, 9, and 12.

Figure 14:
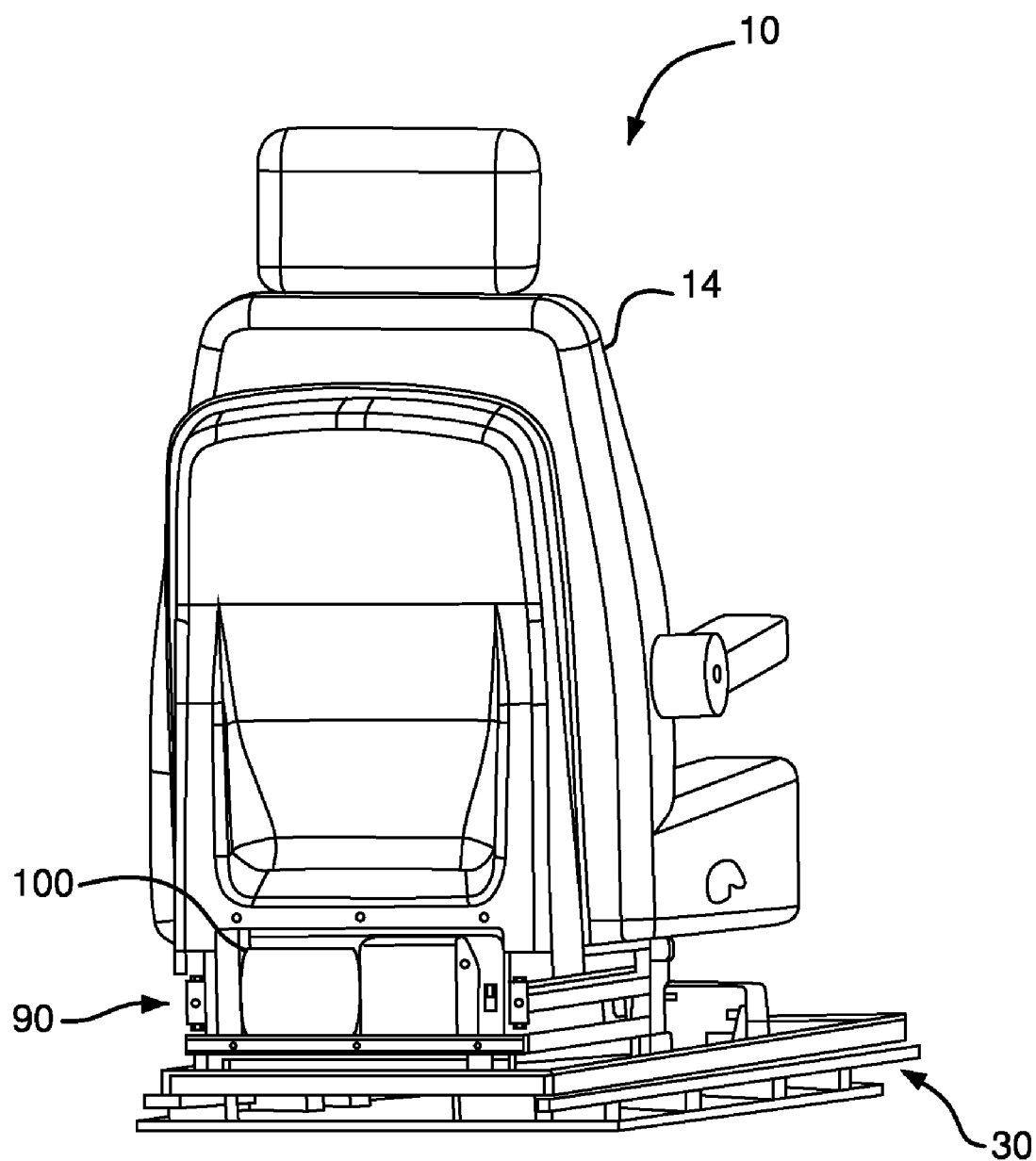
FIG. 14 is a rear perspective view of the system shown in FIGS. 1A-5 and 7-13, depicting the seat of the system in its rearward, un-docked position.
Figure 15:
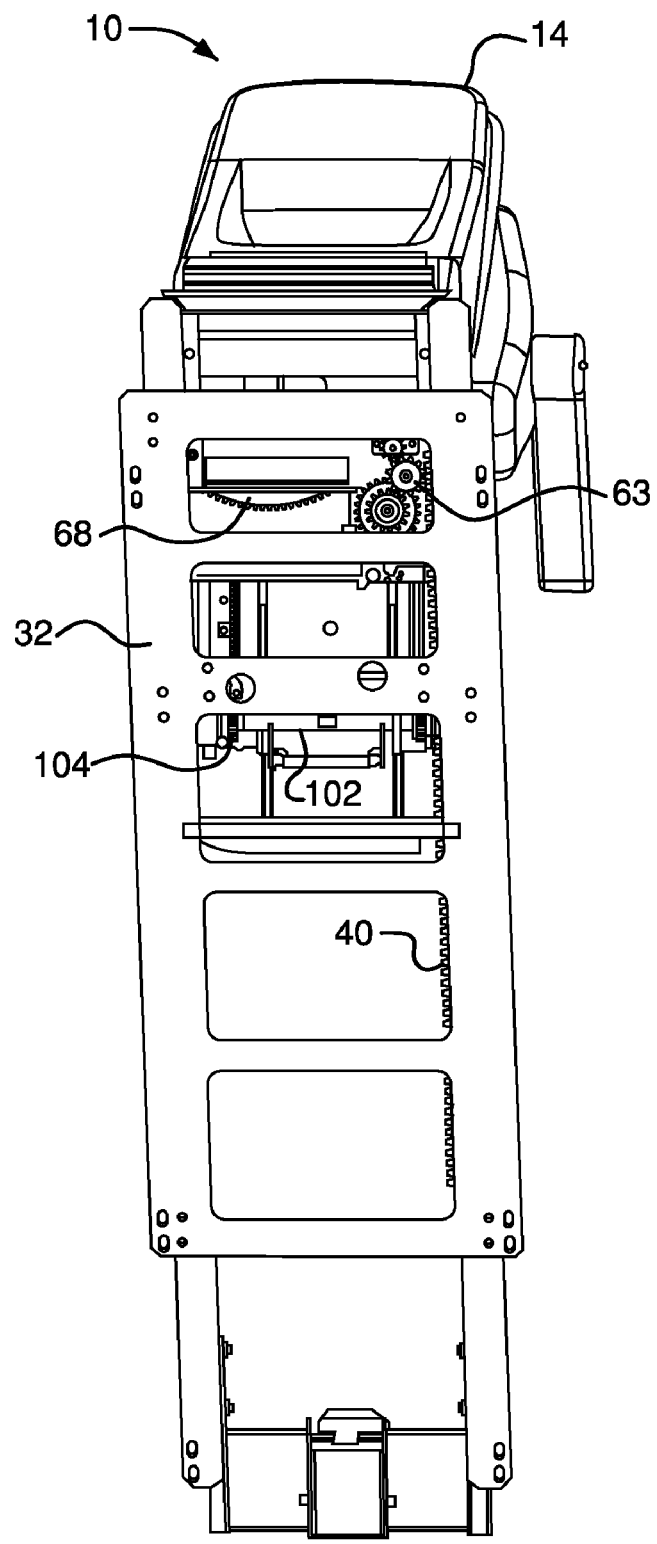
FIG. 15 is a bottom view of the system shown in FIGS. 1A-5 and 7-14, depicting the seat of the system in its rearward, un-docked position.

The system 10 also includes a lift motor 100 mounted on the base pan 70, proximate a rearward end thereof as shown in FIG. 14. The system 10 further includes a drive shaft 102 mounted on the base pan 70, proximate a forward end thereof. The drive shaft 102 is coupled to the base pan 70 by way of bearings that permit the drive shaft 102 to rotate in relation to the base pan 70. The drive shaft 102 is depicted in FIG. 15. A sprocket on the drive shaft 102 is coupled to a sprocket on the lift motor 100 via a chain 104, so that activation of the lift motor 100 causes the drive shaft 102 to rotate.

The trolley assembly 90 also includes two substantially L-shaped racks 108, as shown in FIGS. 4, 7, 9, 10, 12, and 13. The seat 14 is mounted on the racks 108 by way of spacers 110. Each rack 108 has gear teeth that engage additional sprockets (shown in FIG. 15) on the drive shaft 102, so that rotation of the drive shaft 102 causes the racks 108 to translate in relation to the trolley rails 92. The substantially horizontal portions of the racks 108 are captured between the trolley plate assembly 90 and bearings 111 mounted on the side plates 95, as shown in FIGS. 7 and 9.

Figure 4:
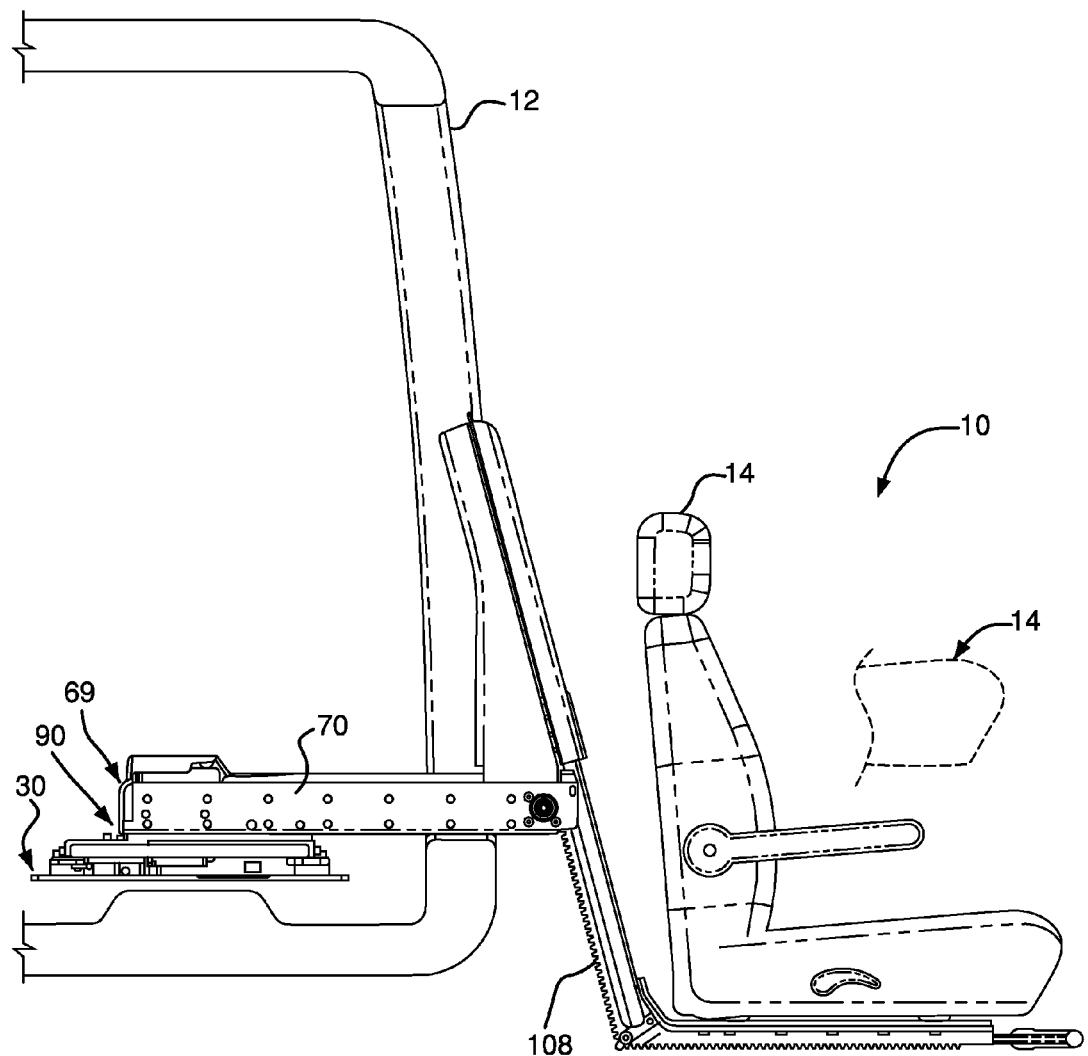
FIG. 4 is a front view of the system shown in FIGS. 1A-3, depicting the seat in the orientation depicted in FIGS. 2 and 3 and in a lower position outside of the motor vehicle.
Figure 6A:
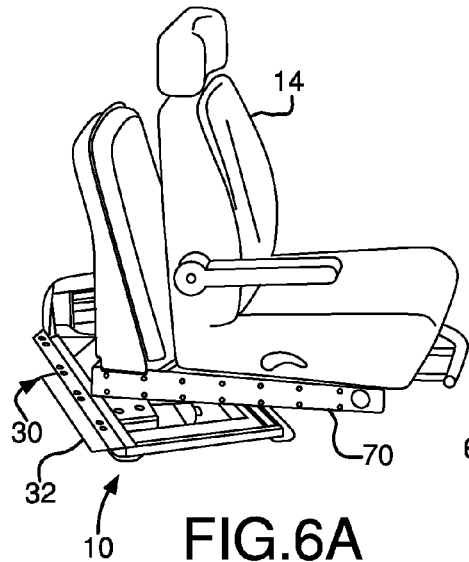
FIG. 6A is a front perspective view of an alternative embodiment of the system shown in FIGS. 1A-5 configured for rearward docking, depicting the seat of the system in a forward, partially-rotated position.
Figure 6B:
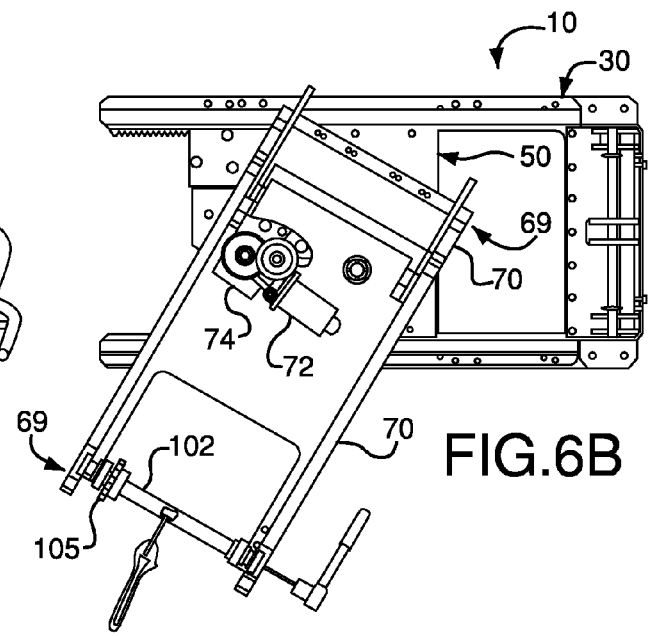
FIGS. 6B-6D are top views of the system shown in FIG. 6A, with the seat of the system removed for purposes of illustration and depicting the seat being retracted on a manual basis.
Figure 6C:
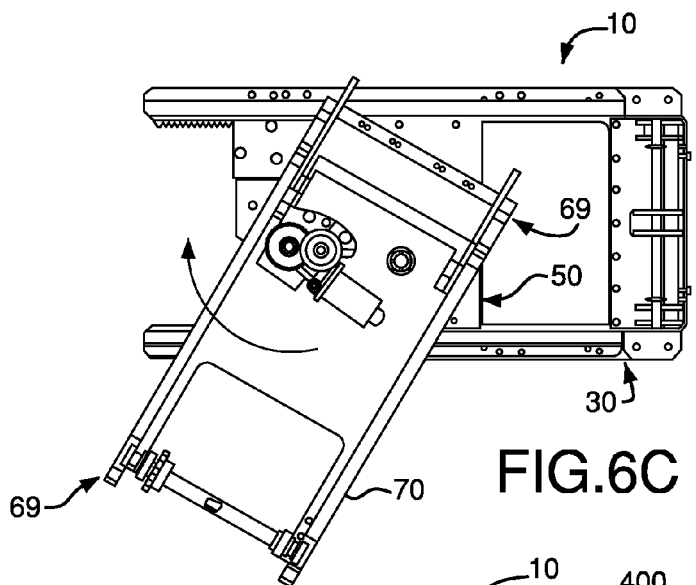
Figure 6D:
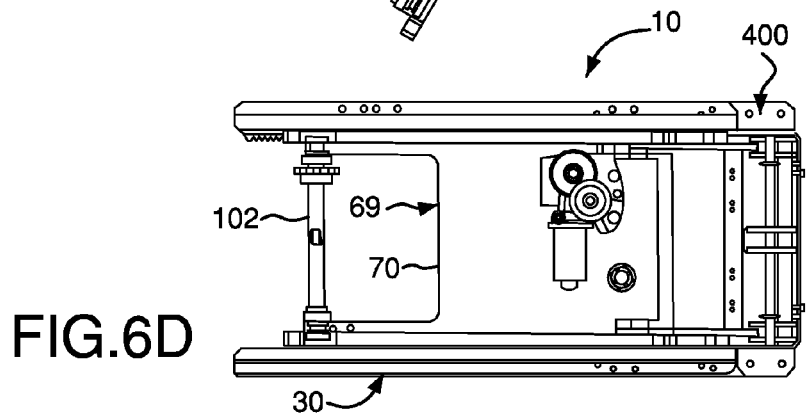

The interaction of the drive shaft 102 and the racks 108 causes the seat 14 to translate linearly, in the horizontal plane, between a retracted, or back position shown in FIGS. 1A-3, and an extended, or forward position shown in FIG. 4. The interaction of the drive shaft 102 and the racks 108 also causes the seat 14 to raise and lower between an upper position shown in FIGS. 1A-3, and a lower position shown in FIG. 4.

For example, activating the lift motor 100 when the seat 14 is located in its rearward, upper, rotated position causes the drive shaft 102 to rotate by way of the chain 104. The interaction of the sprockets 105 on the drive shaft 102 and the horizontal portions of the racks 108 drives the racks 108, and the attached seat 14 horizontally, in the direction denoted by the arrow 199 in FIG. 3.

Continued rotation of the drive shaft 102 after the seat 14 has been extended fully out of the motor vehicle 12 causes the drive-shaft sprockets 105 to engage the substantially vertical portions of the racks 108. The interaction of the sprockets 105 and the substantially vertical portions of the racks 108, in conjunction with the guiding effect of the trolley plate assembly 94 and the bearings 111 on the racks 108, causes the racks 108 to "climb down" the drive shaft sprockets 105, thereby lowing the chair 14 in relation to the motor vehicle 12, to the position depicted in FIG. 4.

The racks 108 can be substantially straight, i.e., non-L-shaped, in alternative embodiments in which vertical movement of the seat 14 is not required.

Moreover, the lift motor 100 can be deactivated when the seat 14 has been extended fully out of the motor vehicle 14, and before the seat 14 begins to lower. The drive motor 60 can then be activated to move the seat 14 forward or rearward in relation to the motor vehicle 12. For example, the seat 14 can be moved forward or rearward to more closely align the seat 14 with a personal transportation vehicle, such as a power chair, located next to the motor vehicle 12. The lift motor 100 can be reactivated when the fore-aft position of the seat 14 has been adjusted, and the seat 14 can be lowered to a level suitable for transfer of the user from the seat 14. The noted horizontal and vertical movement of the seat 14 while the seat 14 is located outside of the motor vehicle 12 is hereinafter referred to as "planar shifting."

Reversing the lift motor 100 after the chair 14 has reached its rearward, lower position causes the racks 108 to "walk up" the drive shaft sprockets 105, thereby raising the chair 14. Continued rotation of the drive shaft 102 after the chair 14 reaches its upper position causes the chair 14 to retract into the motor vehicle 12, in the direction denoted by the arrow 198 in FIG. 3.

The drive motor 60, turnout motor 72, and lift motor 100 can be activated simultaneously so that the seat 14 undergoes a combination of rotational and linear translation that causes the seat 14 travel in a curvilinear path in relation to the motor vehicle 12. This feature can facilitate navigation of the chair 14 around obstacles within the motor vehicle 12, such as door posts.

Alternative embodiments of the system 10 can be configured without provisions to lift and lower the seat 14.

The system 10 can include provisions to return the seat 14 to its forward, upper position manually, in the event the seat 14 cannot be moved using the drive motor 60, turnout motor 72, and/or lift motor 100 due to malfunctions thereof, loss of electrical power from the motor vehicle 12, etc.

For example, the turnout gearbox 74 can be pivotally mounted to the base pan 70, so that the turnout gearbox 74 and the turnout motor 72 can pivot about a pivot point 200 shown in FIG. 5. A spring 202 is connected to the turnout gearbox 74 and the base pan 70. The spring 202 biases the turnout gearbox 74 and the attached turnout motor 72 in the counterclockwise direction, from the perspective of FIG. 5. A locking bolt 203 that engages the base pan 70 urges the turnout gearbox 74 in the clockwise direction, against the bias of the spring 202, until the spur gear 77 of the turnout gearbox 74 engages the turnout rack 68.

The locking bolt 203 can be backed away from the turnout gearbox 74 so that the bias of the spring 202 causes the turnout gearbox 74 to rotate in the counterclockwise direction, until the spur gear 204 disengages from the turnout rack 68. The base pan 70 and the seat 14 at this point can be rotated manually to positions suitable for retraction of the seat 14 in the motor vehicle 12, or movement the seat 14 to its forward position.

The traverse drive motor 60 can be pivotally coupled to the bearing plate 59, so that the traverse drive motor 60 can pivot in relation to the bearing plate 59 about a pivot point 210 depicted in FIG. 5. A spring 212 is connected to the traverse drive motor 60 and the bearing plate 59. The spring 212 biases the traverse drive motor 60 in the counterclockwise direction, from the perspective of FIG. 5. A locking bolt 213 that engages the carriage assembly 50 urges the traverse drive motor 60 in the clockwise direction, against the bias of the spring 212, until a spur gear 214 of the traverse drive motor 60 engages a drive gear 216 of the traverse drive gearbox 62.

The locking bolt 213 can be backed away from the traverse drive motor 60 so that the bias of the spring 212 causes the traverse drive motor 60 to rotate in the counterclockwise direction, until the spur gear 214 disengages from the drive gear 216. The carriage assembly 50 and the seat 14 at this point can be moved manually between their respective forward and rearward positions.

When the seat 14 is located in its lower position, or between its upper and lower positions when manual retraction is required, the seat 14 can be raised to its upper position by rotating the drive shaft 102 using a suitable means such as a wrench or a socket, to back-drive the lift motor 100.

The system 10 can include provisions to lock the seat 14 in its forward, upper position so that the seat 14 can withstand the impact loads that can occur in a motor vehicle accident. This feature can help the seat 14 meet crashworthiness standards for passenger vehicles.

The seat-locking locking provision can be in the form of a docking mechanism 300. The docking mechanism 300 can be mounted at the forward end of the mounting frame 30, as shown in FIG. 1B. The docking mechanism 300 can be mounted at this location, for example, in applications in which the seat 14 is to be used in the driver or front-passenger positions in the vehicle 14, or in other applications in which it is desired to lock the seat 14 in its forward, upper position.

The docking mechanism 300 includes a receptacle or yoke bracket 302, and a base 304 as shown in FIG. 12. The yoke bracket 302 and the base 304 are fixed to the mounting frame 30. The yoke bracket 302 has side plates 305 that define slots 306. The docking mechanism 300 also includes two docking levers (not shown) positioned within the yoke bracket 302. The docking levers are pivotally coupled to the side plates 305, so that the docking levers can pivot between a locking position, and a releasing position.

The docking mechanism 300 also includes a solenoid (not shown) mounted on the base 304. The solenoid is coupled to the docking levers so that activation of the solenoid causes the docking levers to pivot between their locking and releasing positions. The docking mechanism 300 also includes a gusset assembly 314, as shown in FIG. 12. The gusset assembly 314 can be fixed directly or indirectly to the chair 14. The gusset assembly 314 includes a plow bracket 316. The slots 310 in the yoke bracket 302 receive the plow bracket 316 when the seat 14 is in its forward, upper position as shown FIG. 1A. The solenoid 307 can be activated to move the docking levers to their locking positions when the plow bracket 302 is positioned within the slots 306.

The docking levers, when in their locking positions, engage the plow bracket 316 so that the plow bracket 316 remains in the slots 306, thereby restraining the seat 14 in its forward position. The solenoid can be activated to move the docking levers to their releasing positions when it is desired to move the seat 14 away from its forward position.

Additional details of docking mechanisms such as the docking mechanism 300 can be found in U.S. Pat. Nos. 7,108,466 and 6,837,666. The contents of each of these patents are incorporated by reference herein in their entireties.

Figure 16:
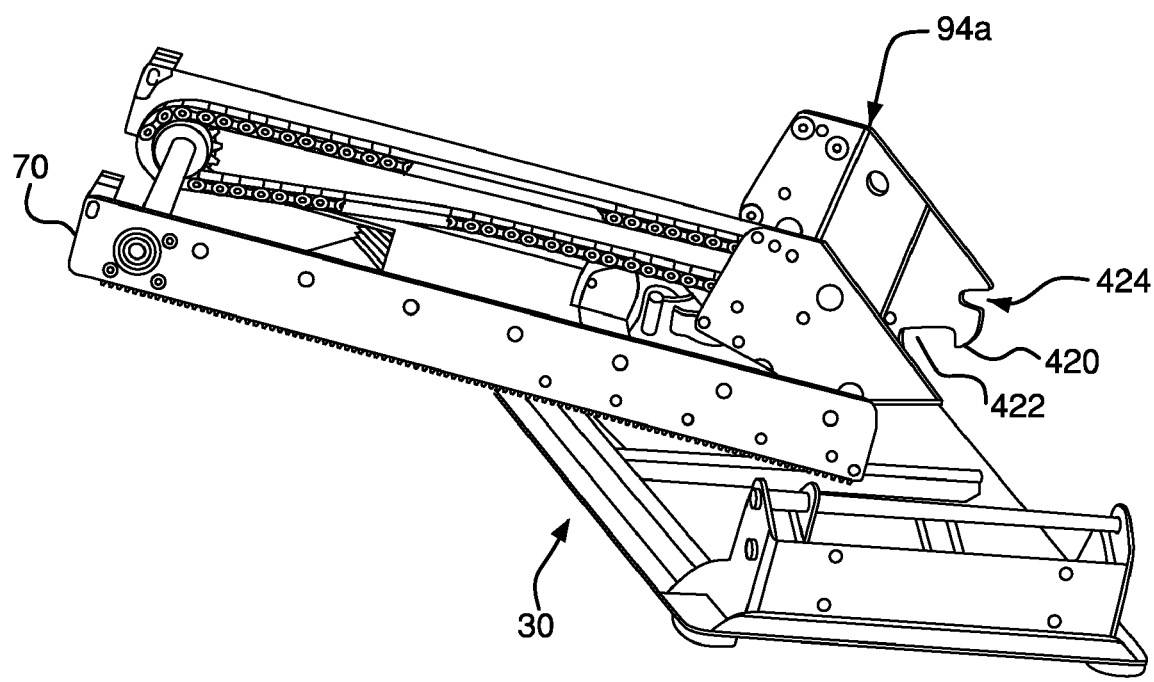
FIGS. 16-18 are top perspective views of the alternative embodiment shown in FIGS. 6A-6D, with a seat of the system is removed for purposes of illustration, and a base assembly of the system is in a partially-rotated position.
Figure 17:
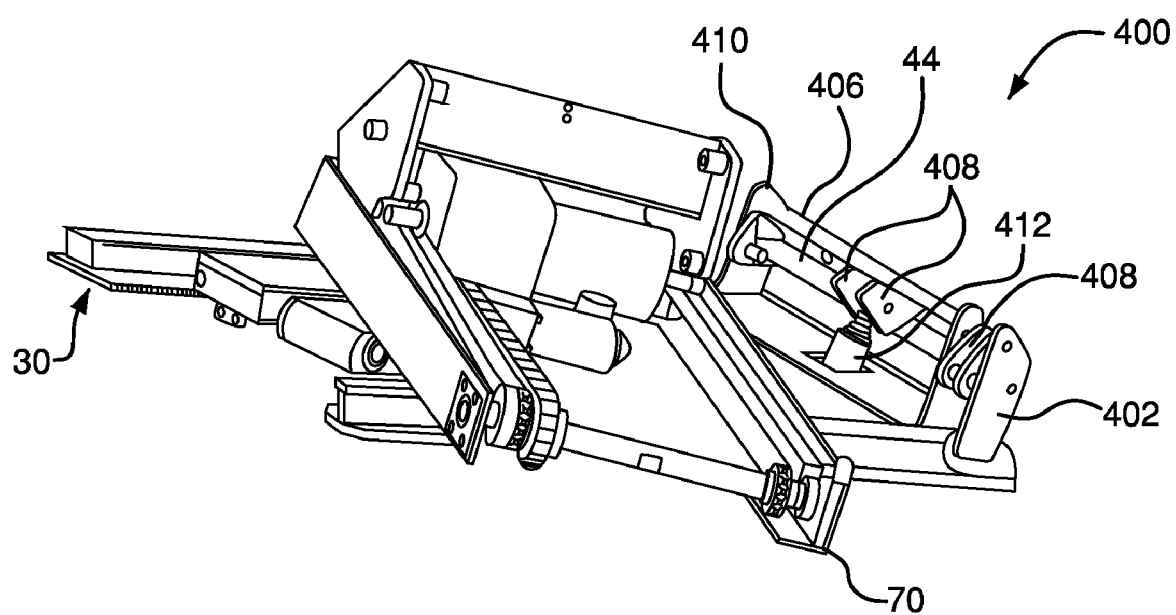
Figure 18:
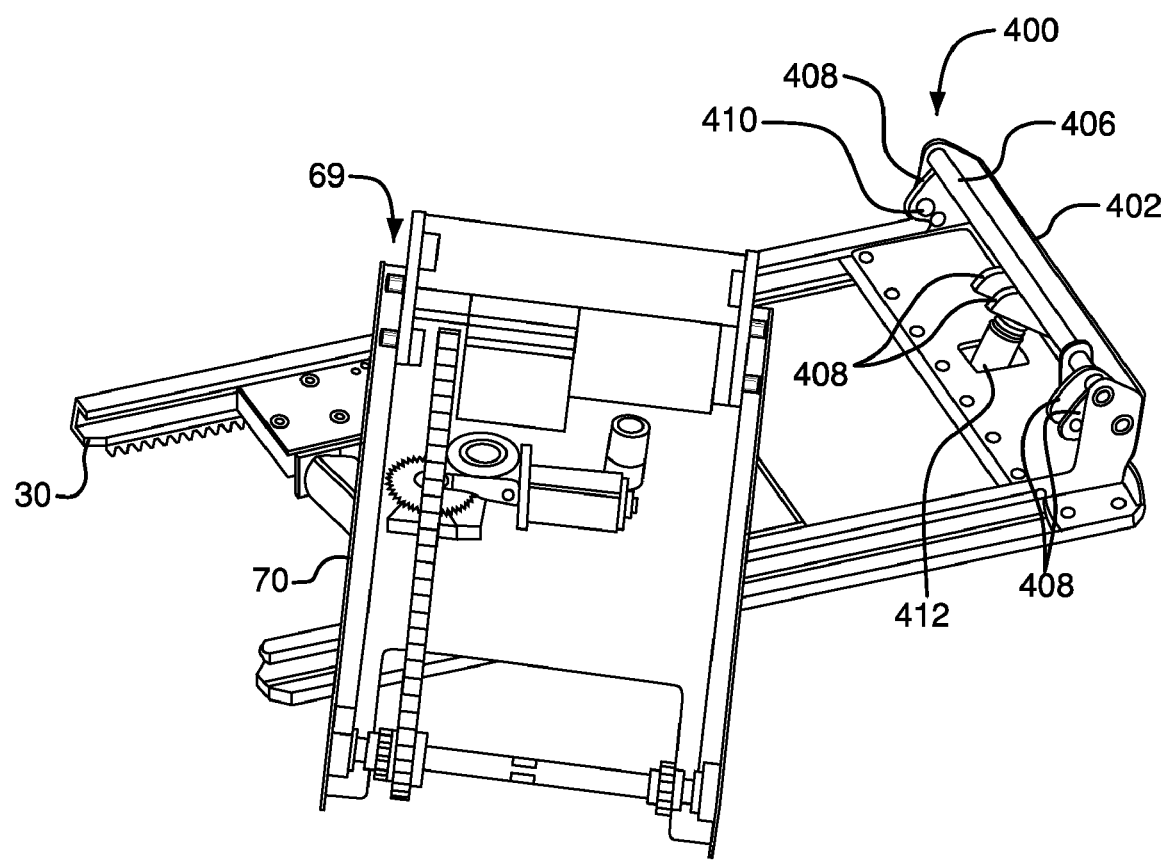
Figure 19:
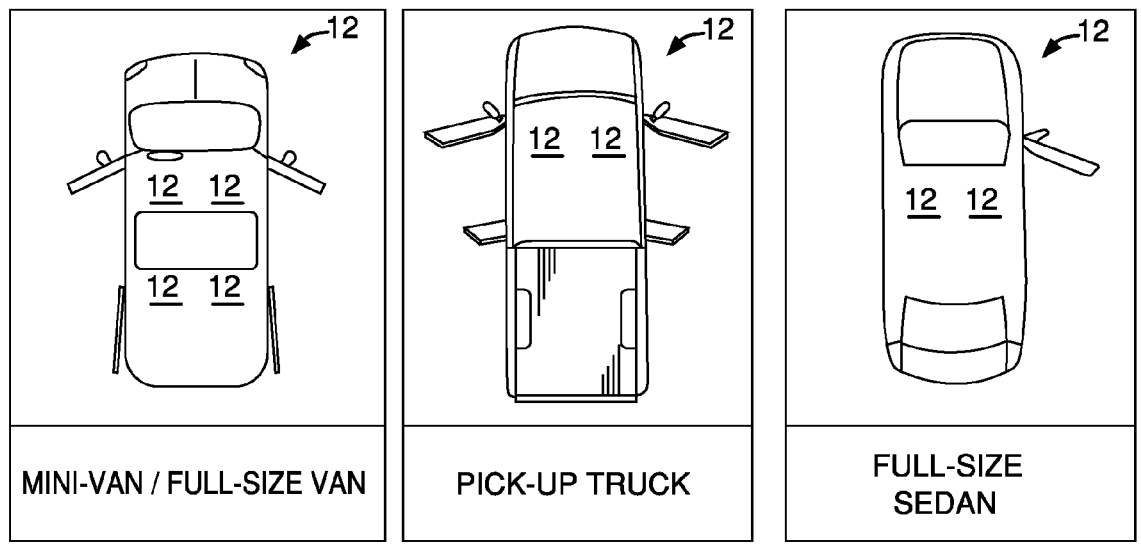
FIG. 19 depicts various types of motor vehicles in which the systems shown in FIGS. 1-18 can be installed, showing the various possible locations for the systems within the vehicles.

Alternatively, the docking mechanism can be positioned at the rearward end of the mounting frame 30 in applications in which it is desired to lock the seat 14 in its rearward, upper position. A rearward-located docking mechanism 400 is shown in FIGS. 16-18, and includes a back plate 402 fixed to rearward end of the mounting frame 30. The docking mechanism 400 also includes a plow shaft 406 that extends between the opposing sides of the back plate 402.

The docking mechanism 400 further includes three pairs of plow links 408, and three plow pins 410 that each extend between an associated pair of the plow links 408. The docking mechanism 400 also includes a solenoid 412 mounted on the back plate 402, and a plow tube 414. The solenoid 412 is coupled to the plow tube 414 by the center pair of plow links 408, so that actuation of the solenoid imparts rotation to the plow tube 414. Rotation of the plow tube 414, in turn causes the plow pins 410 associated with the outermost pair of plow links 408 to translate between a locking position and a releasing position.

A trolley plate 94a for use with the system 400 has hooked portions 420 that defines spaces 422 that receive the outermost plow pins 410 when the seat 14 is in its rearward position, and the plow pins 410 are in their locking positions. These features are depicted in FIG. 16. The trolley plate 94a also defines slots 424 that receive the plow shaft 406 when the seat 14 is in its rearward, upper, non-rotated position. The engagement of the hooked portions 420 and the plow pins 410 restrains the trolley plate 94a and the chair 14 from moving forward from the rearward position. The engagement of the trolley plate 94a and the plow shaft 406 restrains the trolley plate 94a and the seat 14 in the vertical direction.

The solenoid 412 can be activated to move the plow pins 410 to their releasing positions, thereby permitting the trolley plate 94a and the chair 14 to move forward from the rearward position.

Figure 20:
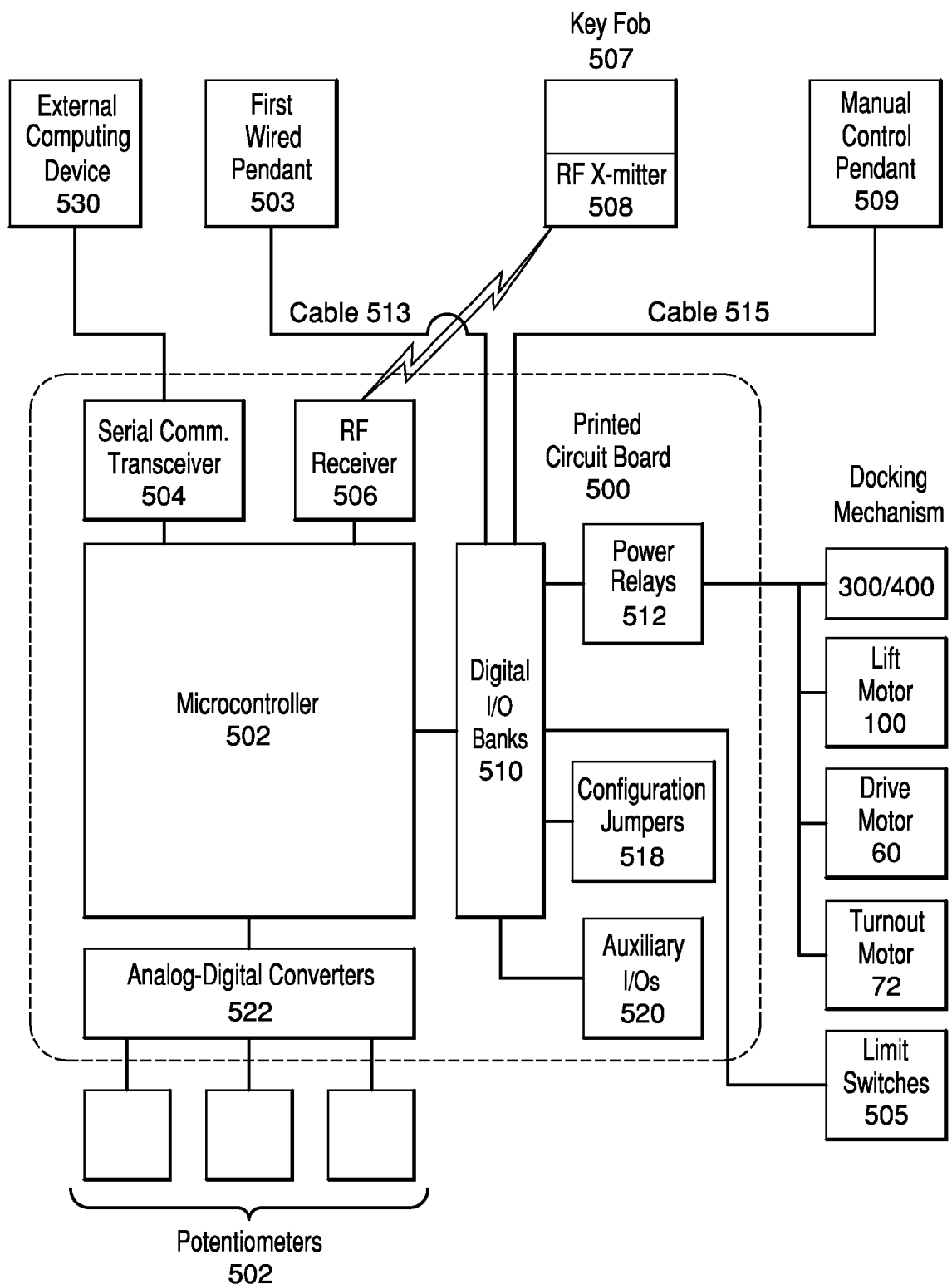
FIG. 20 is a block diagram depicting various electronic and electrical components of the system shown in FIGS. 1A-5 and 7-15.

The system 10 comprises a multilayer printed circuit board 500 that includes a portion of the electronics of the system 10. FIG. 20 is a diagram that depicts the logical functional grouping of the electronics on the printed circuit board 500.

The electronics and electrical components of the system 10 that are not integrated into the printed circuit board 500 can include, without limitation: rotary potentiometers 501 and limit switches 505 for each individual path or axis of motion of the seat 14; the drive motor 60; the turnout motor 72, the lift motor 100; a pendant connector port; a programming connector port; and wiring. The use of rotary potentiometers 501 is disclosed for exemplary purposes only; other types of position-measurement devices can be used in the alternative.

Controller

The printed circuit board 500 comprises a controller such as a microcontroller 502 shown in FIG. 20. The microcontroller 502 comprises, and executes the firmware that defines the motion of the seat 14. The microcontroller 502 is integrated with the communications, input, and output sub-systems of the printed circuit board 500.

The microcontroller 502 can be, for example, a computing device incorporated into a single integrated circuit chip. The microcontroller 502 has dedicated non-volatile memory storage for configuration variables, operational parameters, and manufacturer and service information. The microcontroller 502 has the capability to be reprogrammed in the field. This capability can be used, for example, to implement firmware upgrades in the field.

Communications

The printed circuit board 500 comprises electronics for serial communications. The microcontroller 502 is electrically connected to a serial communications transceiver 504 and a line driver (not shown). The serial communications transceiver 504 and the line driver facilitate communications between the electronics of the system 10, and an external computing device 530 depicted in FIG. 28. The external computing device 530 can be, for example, a personal computer.

Figure 28:
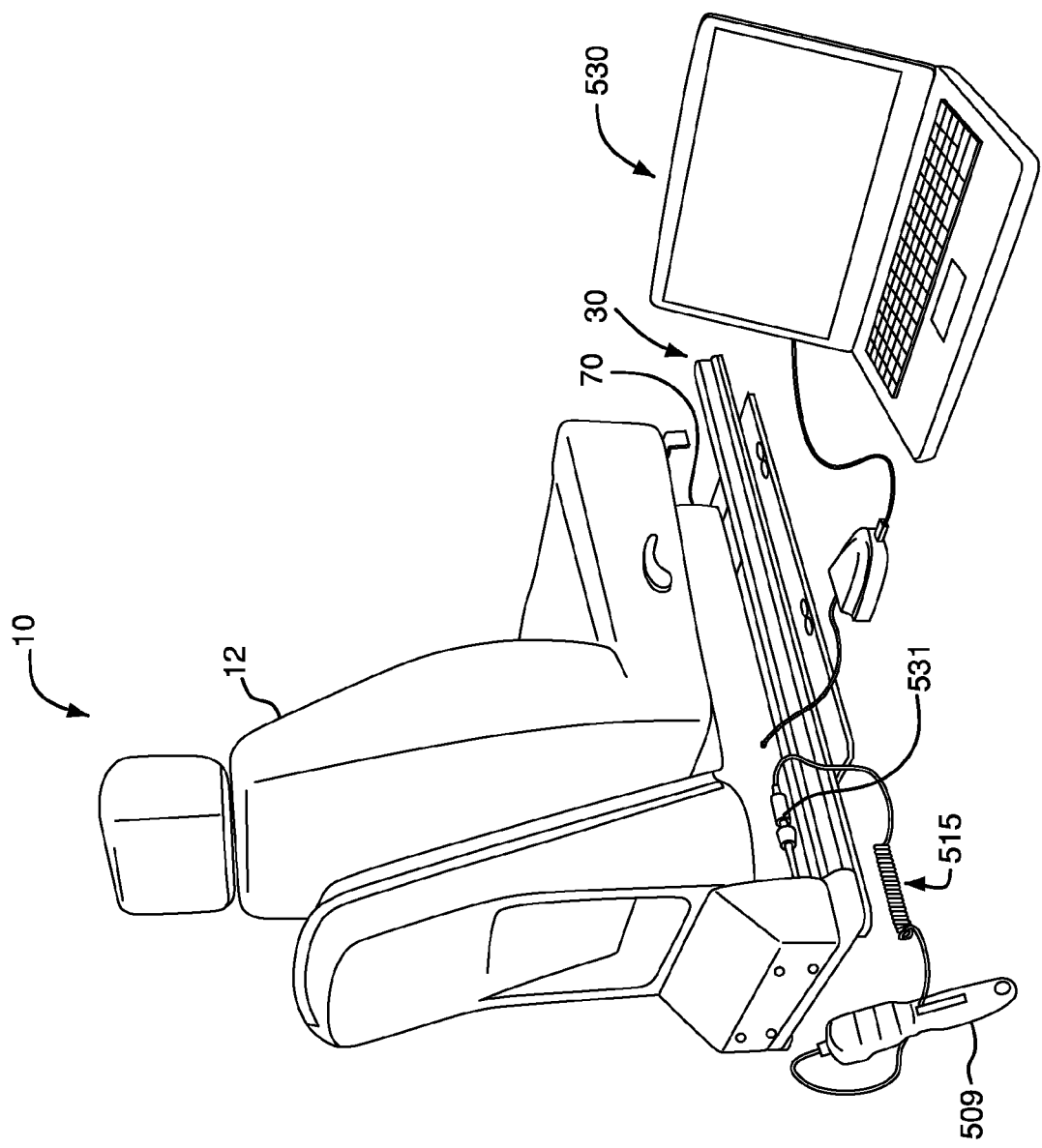
FIG. 28 is a perspective view of the system shown in FIGS. 1A-5, 7-15, and 20-23, with an external computing device and a manual-control pendant connected thereto.

Control inputs from the user can be generated using one or more of a first wired pendant 503; a key fob 507, and a second wired pendant hereinafter referred to a manual-control pendant 509. The first wired pendant 503, key fob 507, and manual-control pendant 509 are depicted in FIG. 20; the manual-control pendant 509 is also depicted in FIG. 28. Other types of control-input devices can be used in lieu of, or in addition to the first wired pendant 503, key fob 507, and manual-control pendant 509.

The key fob 507 can be used to initiate movement of the chair 14 under certain types of control modes discussed below. The key fob 507 has a series of buttons that, when pressed by the user, cause the key fob 507 to generate control inputs for the system 10. The key fob 507 includes a radio-frequency (RF) key fob transmitter 508 that transmits the control inputs as RF signals. The printed circuit board 500 includes an RF receiver 506 that receives the RF signals. The RF receiver 506 generates a control input for the microcontroller 502 based on the incoming RF signals. The RF receiver 506 and the RF key fob transmitter 508 can use a hopping code scheme to help ensure that the inputs reaching the printed circuit board 500 originate exclusively from the RF key fob transmitter 508.

The first wired pendant 503 can be utilized in addition to, or in lieu of the key fob 507. The first wired pendant 503 can be used to initiate movement of the chair 14 under certain types of control modes discussed below. The first wired pendant 503 is communicatively coupled to the circuit board 500 by way of a cable 513, as shown in FIG. 28. The first wired pendant 503 has a series of buttons that, when pressed by the user, cause the first wired pendant 503 to generate control inputs for the system 10. The control inputs are transmitted to the circuit board 500 as a digital signal by way of the cable 513.

The manual-control pendant 509 can be used to control the movement of the chair 14 on a manual basis. This capability, as discussed below, can be used to program a specific path for the chair 14 into the microcontroller 502. The manual-control pendant 509 is communicatively coupled to the circuit board 500 by way of a cable 515, as shown in FIG. 28. The manual-control pendant 509 has a series of buttons that, when pressed by the user, cause the manual-control pendant 509 to generate control inputs for the system 10. The control inputs are transmitted to the printed circuit board 500 as a digital signal by way of the cable 515. The use of a six-button pendant as the manual-control pendant 509 is described for exemplary purposes only; pendants having more or less than six buttons can be used in the alternative. The manual-control pendant 509 is typically used only during programming operations. Thus, the cable 515 can be connected to the printed circuit board 500 by way of a connector 531 that permits the cable 515 to be connected to and disconnected from the printed circuit board 500 with relative ease.

Digital I/O

The printed circuit board 500 comprises digital input/output banks 510 communicatively coupled to the microcontroller 502. The microcontroller 502 uses the digital input/output banks 510 to control the various electronic components of the system 10, and to receive user and sensor inputs. In particular, the digital I/O banks 510 facilitate control of the drive motor 60, turnout motor 72, and lift motor 100 by way of power relays 512. In addition, the digital I/O banks 510 receive inputs from the first wired pendant 503, the manual-control pendant 509, limit switches 505, and configuration jumpers 518. The digital I/O banks 510 also receive audible/visible alerts, and pendant/programmer connection information. All digital inputs to the digital I/O banks 510 contain appropriate signal buffering and protection for the various electronic components of the printed circuit board 500.

The power relays 512 are used to energize and de-energize the drive motor 60, turnout motor 72, and lift motor 100 in response to inputs from the microcontroller 502, to facilitate movement of the seat 14 in the desired direction. Two power relays 512 are provided for each of the drive motor 60, turnout motor 72, and lift motor 100, to facilitate activation and deactivation of each motor in the forward and reverse directions. A power relay 512 is also provided to facilitate release of the solenoid of the docking mechanism 300 or the docking mechanism 400.

The first wired pendant 503 can generate an output in the form of an Ignition Signal that commands the firmware of the microcontroller 502 to place the system 10 in a "soft power-off" mode, or Listen State. Additional digital inputs to the digital input/output banks 510 can be used to indicate whether the manual-control pendant 509 or programmer is connected to the printed circuit board 500, and the type of manual-control pendant 509 that is connected.

The printed circuit board 500 also comprises a set of jumpers 518 communicatively coupled to the digital input/output banks 510. The jumpers 518 provide the firmware with an indication of the configuration of the system 10, e.g., whether the system 10 is configured for front or rear docking. The firmware is responsible for interpreting the jumper values, and controlling the system 10 in a manner consistent with the system configuration.

The printed circuit board 500 includes an additional bank of digital I/O devices referred to herein as auxiliary I/Os 520. The auxiliary I/Os 520 include signal lines for an Interlock Input Signal and a Variable Output Control Line Signal. Some of the auxiliary I/Os 520 are reserved for future expansion. The application level semantics of these signal lines is determined by the firmware logic described below.

Position Measurement Sub-System

The system 10 can include a position measurement sub-system for determining the location of the seat 14 along each of its axes of motion. The main drive gears of the drive motor 60, turnout motor 72, and lift motor 100 are coupled to the respective traverse gear rack 40, turnout rack 68, and one of the racks 108, as discussed above. The traverse gear rack 40 guides the traverse, or forward-aft motion of the seat 14. The turnout rack 68 guides the turnout, or rotational motion of the seat 14 about the vertical axis. The rack 108 guides the extension of the seat toward and away from the door of the motor vehicle 12; and the elevation, or vertical movement, of the seat 14. An additional gear is coupled to each of the main drive gears of the drive motor 60, turnout motor 72, and lift motor 100. The additional gear is connected to the shaft of one of the potentiometers 501. The resistance value of each potentiometer 501 increases or decreases in proportion to the rotation of the motor. The resistance of each potentiometer 501 can thus be correlated to the position of the seat 14 in relation to the traverse gear rack 40, turnout rack 68, or rack 108.

The potentiometers 501 are connected to an analog-to-digital converter 522 of the printed circuit board 500 by way of protecting and filtering circuitry. This feature enables the electronics of the system 10 to interpret the voltage drop caused by the resistance of the potentiometer 501 as a relative position on an axis.

The position measurement sub-system also incorporates the limit switches 505. Each limit switch 505 is positioned at the innermost point of a given axis of the seat 14. Each limit switch 505 is activated when the seat 14 is moved to the innermost point for the associated path. The limit switches 505 serve as an absolute measurement of the position of the seat 14. The inputs from the limit switches 505 are used in conjunction with the inputs from the potentiometers 501 to determine the absolute and relative positions of the seat 14.

The firmware of the system 10 is configured to react to externally-generated inputs and implement responsive actions on a real-time basis. The general architecture of the firmware is illustrated in a UML State Diagram presented as FIG. 21. The firmware allows the system 10 to be operated in a completely manual basis in which the operator can individually control the motion of the seat 14 along each of its three axes of travel.

The firmware has the ability to communicate with the external computing device 530. The way point path for the seat 14 can be programmed and persisted to a non-volatile memory storage location on the circuit board of the system 10 while the manual-control pendant 509 and the external computing device 530 are connected to the printed circuit board 500. This feature permits play back of the pre-programmed path (referred to as "path following") while the seat 14 is occupied by the passenger, to facilitate easy ingress and egress of the passenger to and from the motor vehicle 12.

The chair 14 follows a pre-programmed path when operating in the path following mode, as noted above. The pre-programmed path is an ordered list of way points read in at processor start up time (or upon request via the serial protocol) from the non-volatile memory store of the printed circuit board 500. The firmware defines a way point as a 4-tuple representing a seat position and is made up of the following components: the output value of the potentiometer 501 associated with the traverse axis; the output value of the potentiometer 501 associated with the rotational axis; the output value of the potentiometer 501 associated with the extend-elevation axis; and a bit mask encoding the state of each of the three limit switches 505. The firmware defines a set point to be a zero-based index into the ordered list of way points, i.e., the first way point would be addressed by the set point 0. The firmware maintains two set points at all times. The inward set point defines the way point position to achieve while traveling inward, i.e., toward the docked position, along the pre-programmed path. The outward set point defines the way point position to achieve while traveling outward along the pre-programmed path. Algorithmic usage of the pre-programmed path, way points, and set points are explained below.

The Listen State

Figure 21:
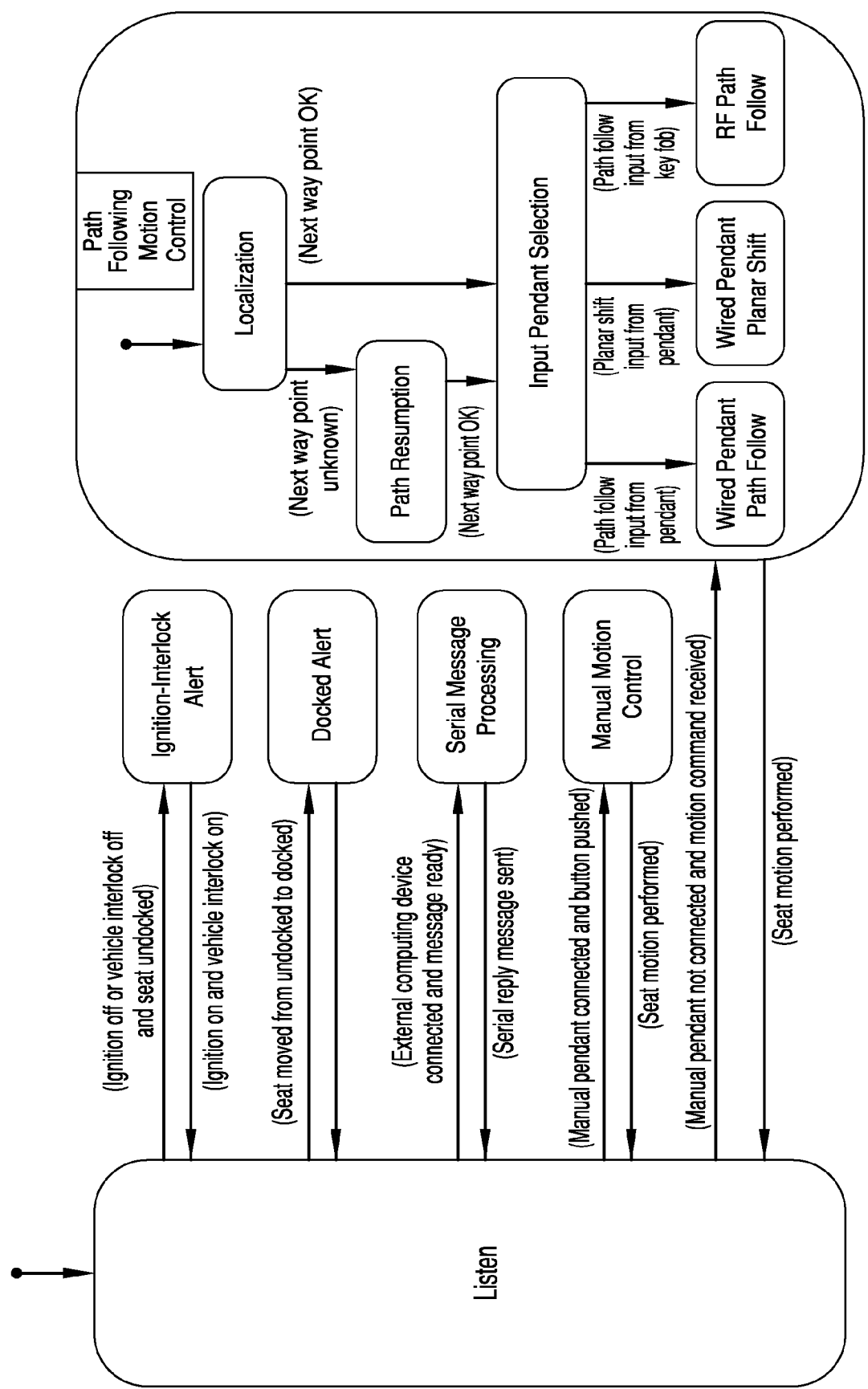
FIG. 21 is a UML state diagram depicting depicts the general architecture of the firmware of the system shown in FIGS. 1A-5, 7-15, and 20.

The firmware has a default state in which the firmware listens for input commands and tracks major transitions in the positional state of the seat 14. The user-visible behavior of the system 10 while in the Listen State is that the seat 14 is idle, i.e., not moving. Referring to FIG. 21, the following "events" trigger a transition from the Listen State to a specialized processing state.

1. When the Ignition Signal from the first wired pendant 503 is off and the seat 14 is undocked from the docking mechanism 300 or the docking mechanism 400, the firmware transitions into an Ignition Alert State.
2. When the seat 14 has moved from an "undocked" to a "docked" state in a discrete processing time period, the firmware transitions into a Docked Alert State.
3. When the external computing device 530 is connected to the serial communications transceiver 504 located on the printed circuit board 500 and the incoming serial byte buffer is not empty, the firmware transitions into a Serial Message Processing State.
4. When the manual-control pendant 509 is connected to the system 10 and any of the buttons thereof are pushed, i.e., are in their "down" position, the firmware transitions into a Manual Motion Control State.
5. When the manual-control pendant 509 is not connected and a motion command is received from the first wired pendant 503 or the key fob 207, the firmware transitions into a Path Following Motion Control State.

The Ignition Alert State

The firmware enters the Ignition Alert State when the seat 14 is undocked and the Ignition Signal from the first wired pendant 503 is off, i.e., the printed circuit board 500 is not receiving the Ignition Signal from the first wired pendant 503. While in this state, the firmware will assert an audible alert once every N seconds up to a maximum period of M seconds elapsed clock time. A typical configuration, for example, would set N=5 and M=30, for a total of 6 audible alerts. The audible alert can be generated by a suitable device such as a beeper 532. The beeper 532 can be mounted on the printed circuit board 500, and can generate a short beeping sound in response to an input from the microcontroller 502.

Once the M-second period expires, the firmware remains in the Ignition Alert State but will no longer assert the audible alert. Motion of the seat 14 is disabled in this mode. The seat 14 will transition from the Ignition Alert State back to the Listen State when the Ignition Signal is turned on using a switch on the first wired pendant 503.

The Docked Alert State

The firmware enters the Docked Alert State when the seat 14 moves from the "undocked" to the "docked" state in a single discrete processing time period. While in this state, the firmware will assert "3 fast beeps," and will immediately transition back to the Listen State. The audible alert performed while in this state alerts the user that the seat 14 is safely docked. A safely docked seat 14 implies that the crash-tested safety devices, e.g., the docking mechanism 300/400, have been engaged and the seat 14 is secured for vehicle travel.

The Serial Message Processing State

The firmware enters the Serial Message Processing State when an external computing device is connected to the serial communications transceiver 504 on the printed circuit board 500, and the incoming serial byte buffer is not empty. While in this state, the firmware accepts request messages from the external computing device 530, carries out the action, and sends back a reply message to the originator of the message. Once this synchronous message exchange is completed, the firmware immediately transitions back to the Listen State. The firmware's ability to transition into the Serial Message Processing State along with a properly formed serial byte stream allows for real-time diagnostics and path programming of the system 10 from an external computing device 530.

The Manual Motion Control State

The firmware enters the Manual Motion Control State when the manual-control pendant 509 is connected to the system 10, and one or more of the buttons of the manual-control pendant 509 are pushed. While in this state, the firmware reads the input signal from the manual-control pendant 509, consults the allowable motion movement commands based on the current position of the seat 14, and either carries out the requested action, or idles the seat 14 when the requested action is not allowed. An example of a non-allowable requested action is a request to manually traverse rearward while docked, and the seat 14 is in a rear-docked configuration. The firmware, in carrying out the requested action, translates the pressed button or buttons on the manual-control pendant 509 into an action in which one or more of the power relays 512 are configured to activate or deactivate one or more of the drive motor 60, turnout motor 72, and lift motor 100 in a manner that causes the seat 14 to translate in the requested manner along one or more of its axes of travel. The firmware immediately transitions back to the Listen State once the respective states of the power relays 512 have been properly mutated based upon the input control command.

The Path Following Motion Control State

The firmware enters the Path Following Motion Control State when the manual-control pendant 509 is not connected to the printed circuit board 500, and a motion input command is received from the first manual pendant 503 or the key fob 507. The Path Following Motion Control State is super-state which contains its own sub-state transition graph as depicted in FIG. 21. The sub-states of the Path Following Motion Control State are as follows:

1. The Localization State

The Localization State is the first sub-state the firmware enters while in the Path Following Motion Control State. In the Localization State, the firmware evaluates the current position of the seat 14 within the context in which the motion command was requested. The firmware determines whether the current inward and outward travel set points are accurate with respect to the current position. If the set points are accurate, the firmware transitions to the Input Pendant Selection State. If the set points are determined to be inaccurate, the firmware transitions to the Path Resumption State.

2. The Path Resumption State

The firmware, when transitioning into the Path Resumption State, operates based on an assumption that the inward and outward set points for the path follower require adjustment. To adjust the set points, the firmware checks whether the seat 14 is docked. If the seat 14 is docked, both the inward and outward set points are set to "way_point[0]" (the docked position). If the seat is located in the planar shifting region, the inward and outward set points are set to "way_point[−1]" (the last way point on the pre-programmed path). If the seat 14 is neither docked nor in the planar shifting region, the firmware calculates the closest set point on the way point path (excluding the docked position) to the current position of the seat 14, and sets both the inward and outward set points to that position. Once the inward and outward set points have been adjusted properly, the firmware transitions to the Input Pendant Selection State.

3. The Input Pendant Selection State

While in the Input Pendant Selection State, the firmware makes the decision to accept commands from either the RF key fob 207 or the first wired pendant 503. If the first wired pendant 503 is not sending an input signal, the firmware transitions to the RF Path Follow State. If the first wired pendant 503 is sending an input signal, the current position of the seat 14 is evaluated to determine whether the position is within the planar shifting region. If the seat 14 is positioned in the planar shifting region, the firmware transitions into the Wired Pendant Planar Shift State. If the seat 14 is not located in the planar shifting region, the firmware transitions to the Wired Pendant Path Follow State.

4. The Wired Pendant Path Follow State

The first wired pendant 503 has "IN" and "OUT" buttons thereon. The firmware, while in the Wired Pendant Path Follow State, interprets inputs indicating that the IN or OUT buttons have been pressed as commands to follow the pre-programmed path of the seat 14 (i) inward to the docked position within the motor vehicle 12, or (ii) outward to the exterior of the motor vehicle 12, respectively. The path following is carried out by consulting the current position of the seat 14, the appropriate directional set point (inward or outward), and the way point that the set point addresses. The firmware then properly mutates the state of the power relays 512 to activate and deactivate the drive motor 60, turnout motor 72, and lift motor 100 so as to move the seat 14 from its current position to the desired set point position. The firmware, after the seat 14 settles to the desired set point position, adjusts the inward and outward set points as appropriate to enable the seat 14 to move to the next way point on the pre-programmed path at the next state transition into the Wired Pendant Path Follow State or RF Path Follow State. The firmware immediately transitions to the Listen State once the state of the power relays 512 have been properly mutated based on the input command.

5. The Wired Pendant Planar Shift State

The first wired pendant 503 also has "UP," "DOWN," "FORE," and "AFT" buttons thereon. The firmware, while in the Wired Pendant Planar Shift State, interprets inputs indicating that one or more of these buttons has been pressed as a command to freely move in two dimensions at the exterior of the vehicle. The firmware then properly mutates the state of the power relays 512 to activate and deactivate the drive motor 60, turnout motor 72, and lift motor 100 so as to move the seat 14 in the desired direction. The movement of the seat 14 in this mode is confined by a set of points which define the top, bottom, foremost, and aft-most positions for two-dimensional translation. The limit points are enforced in order to avoid a collision between the moving structure of the system 10, and the structure of the motor vehicle 12 proximate the door opening of the motor vehicle 12. The drive motor 60, turnout motor 72, and lift motor 100 are activated and deactivated by mutating the state of the power relays 512. The firmware facilitates concurrent translation in the x (forward and aft) and y (up and down) directions in relation to the motor vehicle 12. The firmware also facilitates movement along a single direction only. The firmware immediately transitions to the Listen State once the states of the power relays 512 have been properly mutated based on the planar shifting command.

6. The RF Path Follow State

The key fob 507 has "IN" and "OUT" buttons thereon. The firmware, while in the RF Path Follow State, interprets inputs indicating that the IN or OUT buttons have been pressed as commands to follow the pre-programmed path of the seat 14 (i) inward to the docked position within the motor vehicle 12, or (ii) outward to the exterior of the motor vehicle 12, respectively. The path following is carried out by consulting the current position of the seat 14, the appropriate directional set point (inward or outward), and the way point that the set point addresses. The firmware then properly mutates the state of the power relays 512 to activate and deactivate the drive motor 60, turnout motor 72, and lift motor 100 so as to move the seat 14 from its current position to the desired set point position. The firmware, after the seat 14 settles to the desired set point position, adjusts the inward and outward set points as appropriate to enable the seat 14 to move to the next way point on the pre-programmed path at the next state transition into the Wired Pendant Path Follow State or RF Path Follow State. The firmware immediately transitions to the Listen State once the state of the power relays 512 have been properly mutated based on the input command.

Path Programming Software

The Path Programming Software (referred to hereinafter as "the software") is a software application designed to be run on a personal computer, such as the computing device 530, running a mainstream operating system, e.g., Windows XP, Mac OS X, or Linux. An appropriately-modified version of the software can also be used in hand-held operating systems, e.g., Windows Mobile, Palm OS, Qtopia, etc. The software communicates physically over a serial communications line which connects from the USB or serial port on the computing device 530 or hand-held device to the serial communications transceiver 504 on the printed circuit board 500. Logically, the software implements the Serial Message Protocol which allows for bi-directional communications between the firmware running on the printed circuit board 500, and the software. The following capabilities are enabled by the software.

1. Real-Time Diagnostics

The software can introspect all runtime parameters of the system 10 in real time. These parameters are displayed back to the user on the display of the computing device 530. Beyond simply displaying the values, the software has a priori knowledge of "good levels" and "bad levels" for the various runtime parameters are, and can visually alert a technician as to the overall health of the running system based on this knowledge.

2. Path Programming

The software enables an operator to program a path on to the seat 14 in the following ways.

a. By using the manual-control pendant 509, the operator can manually move the seat 14 on any allowed trajectory, and the software will record that path and persist the path to the non-volatile memory storage of the system 10 for later playback.

b. The software has the capability of importing an XML encoded pre-programmed path, reading that XML from a stream, e.g., a file, a network socket, website, etc., and serializing that path on to the non-volatile memory storage of the system 10 for later playback. This feature permits factory-created pre-programmed paths for specific vehicles to be distributed to dealers and programmed into individual systems 10, without the need to manually reprogram each system 10.

3. Configuration Backups

The software can connect to the system 10 after the system 10 has been programmed, read in the configuration of the system 10, including the pre-programmed path, and save it to an XML stream, e.g., a file, a network socket, website, etc. that complies to the XML discussed above. This feature can facilitate the sharing of a common seat configuration among multiple systems 10, without the need to manually program each system 10.

OEM Vehicle Electronics Integration

Figure 22:
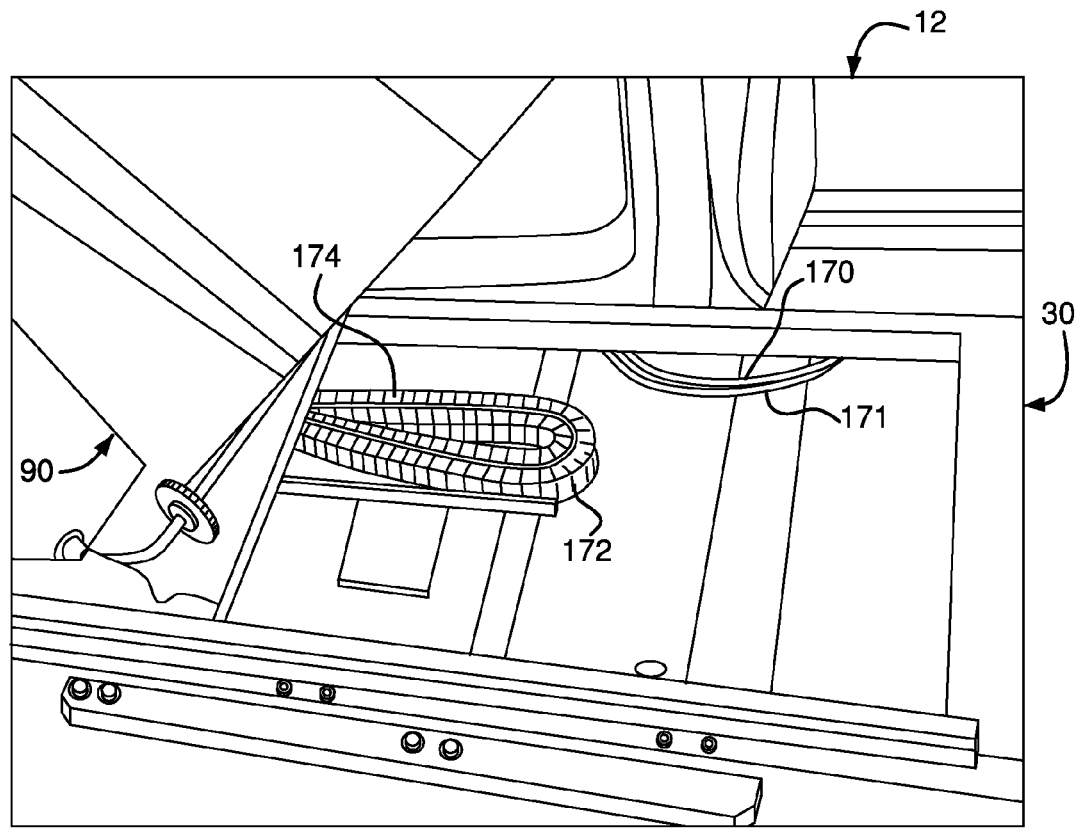
FIGS. 22 and 23 are top perspective view of the system shown in FIGS. 1A-5, 7-15, 20, and 21, with the seat of the system removed for purposes of illustration, and depicting a wire-management sub-system of the system.

The system 10 can incorporate a wire management sub-system that permits electrical power to be routed to the various electrical components of the system 10 by way of a power cable 170 shown in FIG. 22. The wire management sub-system can be expanded to accommodate additional cabling that may be required when the seat 14 is an OEM seat that relies on electrical inputs or outputs for functions such as seat belt integration; airbags; occupancy sensors; position sensors; other safety systems; heated seats, massaging seats; movable seat components; etc.

Integration of the OEM seat with the system 10 can be accomplished by first inspecting the OEM seat to evaluate the feasibility using the OEM seat as the seat 14. In particular, dimensional checks can be made to ensure that the OEM seat can exit and reenter the motor vehicle 12 when integrated with the system 10; and to ensure that the OEM seat can comfortably accommodate the user when integrated with the system 10.

After verifying that the use of the OEM seat is feasible, the wiring of the OEM seat can be inspected to determine the number of conductors present, the size (gage) of each conductor, and the function associated with each conductor. Special characteristics or requirements associated with the wiring, such as twisted conductor pairs or conductor shielding, should be considered when inspecting the wiring.

After the mechanical pathway for the OEM wring has been determined, a wiring harness or cable 171 can be fabricated. The cable 171 should be configured with the proper number and gage of wire conductors based on the specific requirements of the OEM seat to be used as the seat 12. The length of the cable 171 should be sufficient to facilitate routing the cable 171 to the OEM seat in the manner described below.

The individual wires within the cable 171 should be rated for at least twelve volts dc, in applications where the battery of the motor vehicle 12 is a twelve-volt battery. The insulation of the wires should be suitable for operation within a temperature range of approximately −29° F. (−34° C.) to approximately 194° F. (90° C.); should meet or exceed S.A.E. specification J1128, Ford specification M1L56A and Chrysler specification MS3450; and should be highly resistant to grease, oil, and acids.

Figure 23:
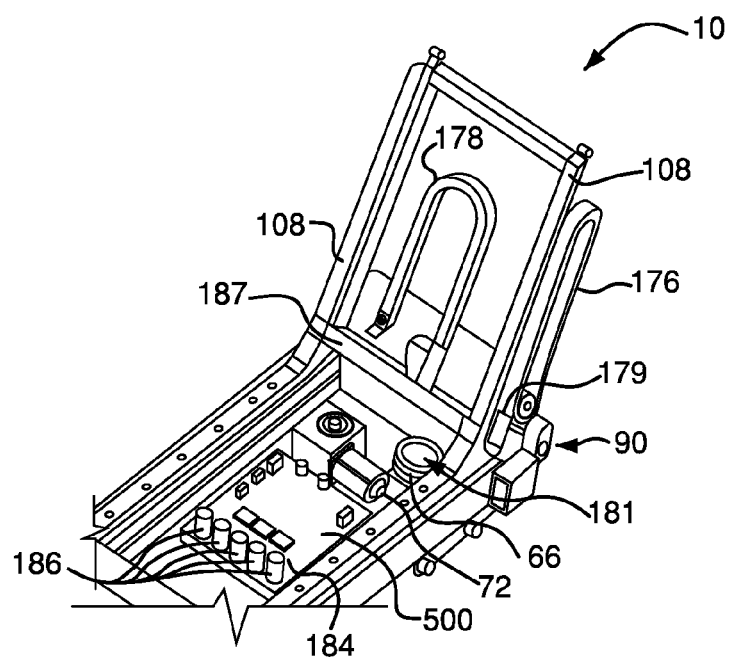

The wire management sub-system can be incorporated into the system 10 after the wiring requirements have been determined and the cable 171 has been fabricated. FIGS. 22 and 23 depict the wiring management sub-system, and illustrate the manner in which wiring for the system 10 can be routed between the various components of the system 10. In particular, FIG. 22 depicts a power cable 170 that conducts electrical power to the system 10 from a battery (not shown) of the motor vehicle 12. The power cable 170 is housed, in part, within an articulating first cable carrier 172. A first end of the first cable carrier 172 is fixed to the mounting frame 30. A second end of the first cable carrier 172 is fixed to the carriage assembly 50. The first cable carrier 172 protects the power cable 170 and discourages tangling of the power cable 170, while permitting the power cable 170 to flex as the carriage assembly 50 moves between its forward and rearward positions.

An E-CHAIN® cable carrier, available from IGUS® Inc., of East Providence, R.I., can be used as the first cable carrier 172. Other types of cable carriers can be used in the alternative.

The power cable 170, upon exiting the second end of the first cable carrier 172, is routed through a wire pass through 181 in the bearing shaft 66, as shown in FIG. 23. The wire pass through 181 acts as a means for routing the power cable 170 between the rotating and non-rotating structure of the system 10.

The power cable 170 is subsequently routed to the printed circuit board 500. In particular, the power cable 170 can terminate in an electrical connector (not shown) that mates with a complementary electrical connector 184 on the printed circuit board 500. Other electrical connectors 186 mounted on the printed circuit board 500 can be use to route the electrical power to the various electrical components of the system 10, including the drive, turnout, and lift motors 60, 72, 100, and the docking mechanism 300 or 400.

The wire management sub-system can also be used to route the cable 171 that carries electrical inputs and outputs to and from the OEM seat that is to be used as the seat 14. In particular, the wire management sub-system can include a second cable carrier 174 as shown in FIG. 22. The second cable carrier 174 can be substantially identical to the first cable carrier 172, and can be positioned side by side with the first cable carrier 172 as depicted in FIG. 22. The cable 171 is housed, in part, within the second cable carrier 174. A first end of the second cable carrier 174 is fixed to the mounting frame 30. A second end of the second cable carrier 174 is fixed to the carriage assembly 50. The second cable carrier 174 protects the cable 171 and discourages tangling of the cable 171, while permitting the cable 171 to flex as the carriage assembly 50 moves between its forward and rearward positions.

The cable 171, after leaving the second cable carrier 174, can be routed through a third cable carrier 176 shown in FIG. 23. A first end of the third cable carrier 176 is fixed to one of the trolley rails 92. A second end of the third cable carrier 176 is fixed to the trolley plate assembly 94. The third cable carrier 176 protects the cable 171 and discourages tangling of the cable 171, while permitting the cable 171 to flex as the seat 12 translates between its retracted, upper position shown in FIGS. 1A-3, and its extended, lower position shown in FIG. 4.

The wire management sub-system also includes a guide 179 fixed to the same trolley rail 92 as the first end of the third cable carrier 176. The third cable carrier 176 passes through the guide 179 as the seat 12 translates between its retracted and extended positions.

The cable 171, after leaving the third carrier 176, can be routed through a fourth cable carrier 178. A first end of the fourth cable carrier 178 is fixed to the cross brace 94 of the trolley plate assembly 94. A second end of the fourth cable carrier 178 is fixed to a frame 187 upon which the seat 12 is mounted. The fourth cable carrier 178 protects the cable 171 and discourages tangling of the cable 171, while permitting the cable 171 to flex as the seat 12 translates between its upper and lower positions.

The OEM seat can be integrated with the system 10 after the cable 171 has been routed in the above-described manner. The individual wires of the cable 171 can be connected to the corresponding wires of OEM seat after the cable 171 has left the fourth cable carrier 178, as follows. The connections should be made paying particular attention to wire gage, twisted or shielded pairs, and colors. The battery of the motor vehicle 14 should be disconnected for at least 20 minutes prior to making the connections.

Figure 24:
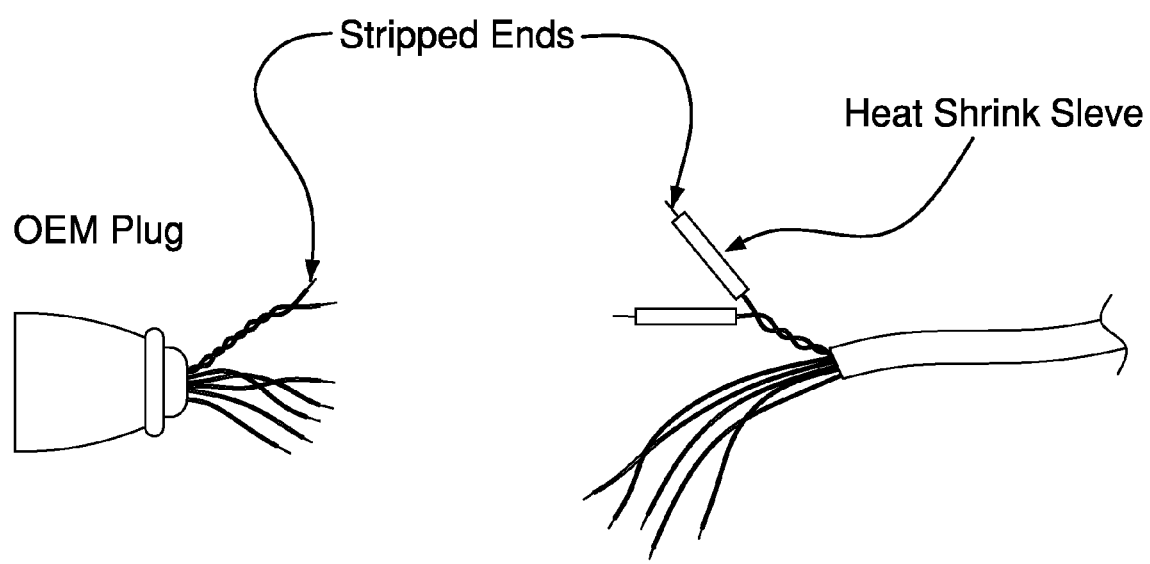
FIGS. 24-27 depict a process by which a cable is spliced between wiring and an electrical connector of an OEM seat used as part of the system shown in FIGS. 1A-5, 7-15, and 20-23.
Figure 25:
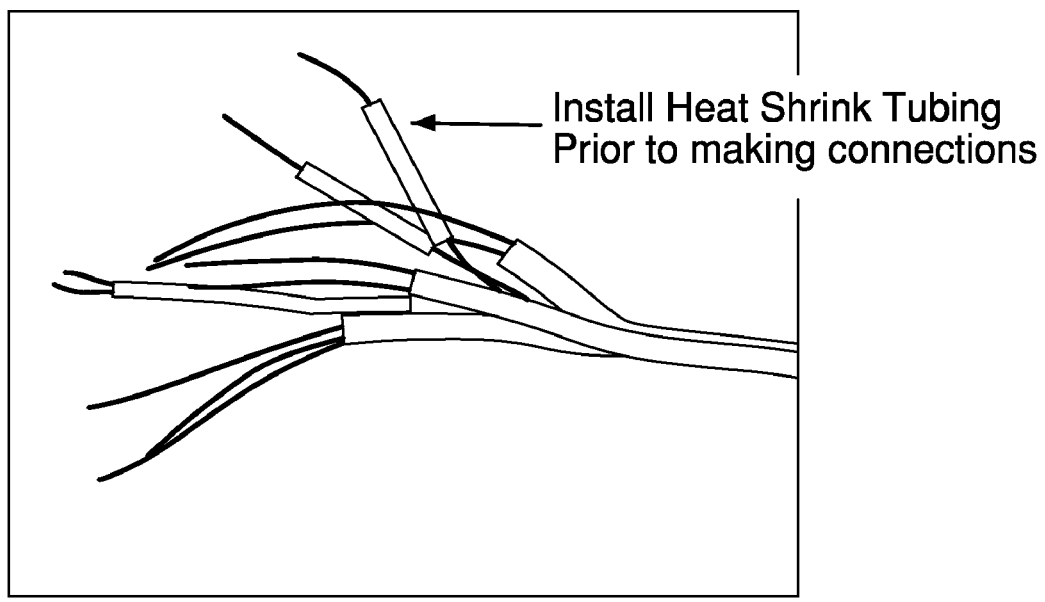

Wiring connections the OEM seat can be made as follows:
1. On the OEM seat cut each individual wire approximately six inches from the OEM connector;
2. Strip ¾-inch of insulation from the ends of all wires on the seat and the OEM connector;
3. Strip ¾-inch of insulation from the wiring at each end of the cable 171;
4. Before the corresponding wires of the OEM seat, the OEM connector, and the cable 171 are connected, place a two-inch long piece of heat shrink tubing over each wire at each end of the cable 171, as shown in FIGS. 24 and 25;
5. Connect each OEM wire to its mate on the cable 171 using a standard inline splice. The wire colors in the cable 171 may not match the colors of the corresponding wires of the OEM seat. The installer should match the OEM wires that connect with each end of the cable 171 with a common color wire in the cable 171. For example, the OEM wires can be matched with the wiring in the cable 171 as follows:

| OEM connector wire | Cable 171 wire | OEM seat wire |
| --- | --- | --- |
| blue/yellow | blue | blue/yellow |
| blue/green | green | blue/green |
| yellow/blue | yellow | yellow/blue |

Figure 26:
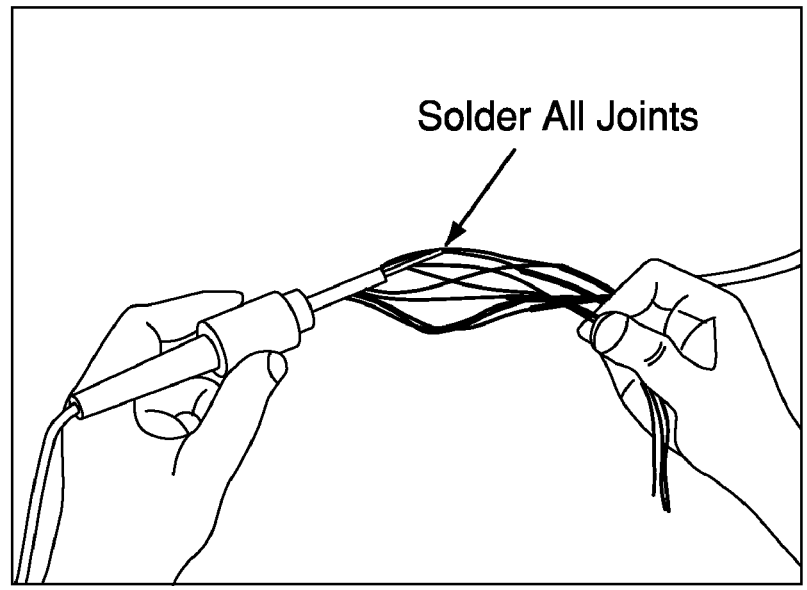
Figure 27:
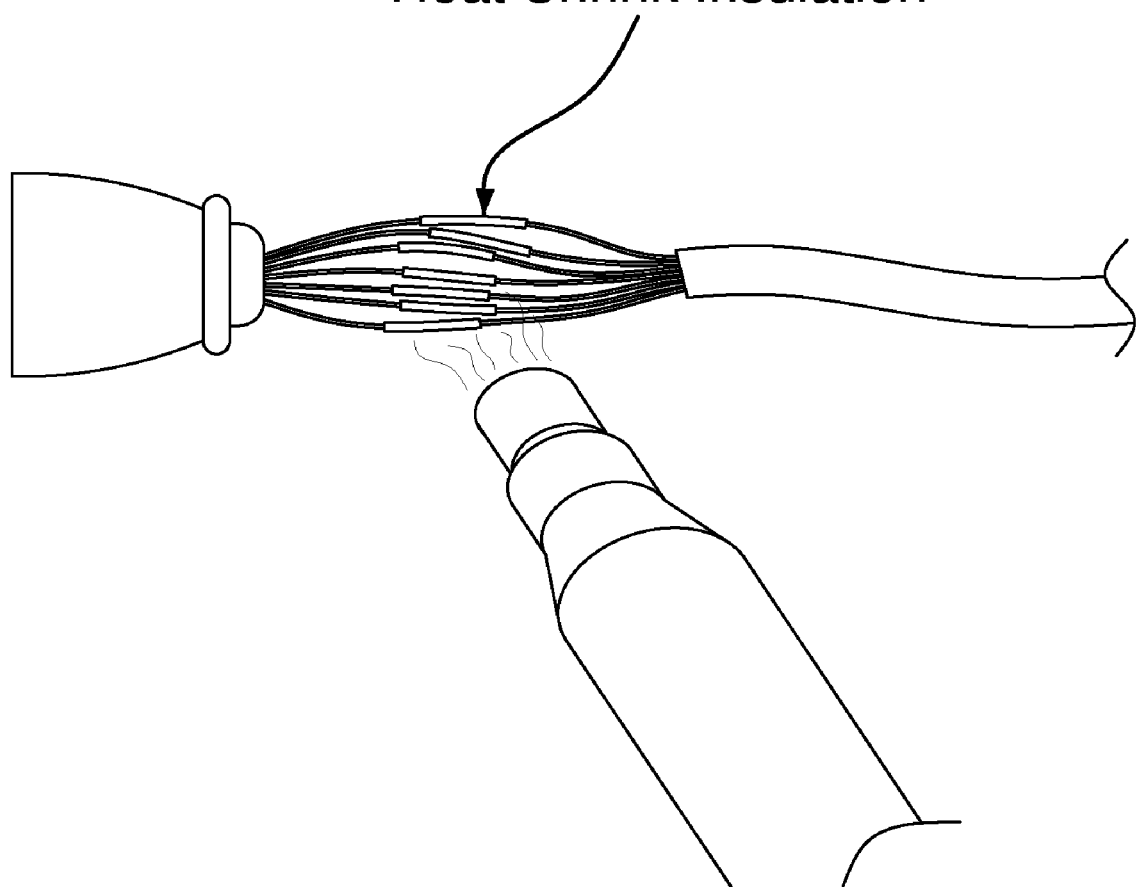

6. Using rosin core solder (appropriate for electrical connectivity) solder each of the joints, as shown in FIG. 26;
7. After the joint cools slide the heat shrink tube over the joint. Using a heat gun shrink the tubing over the soldered connection, as shown in FIG. 27;
8. Assemble the OEM Seat onto a seat adapter plate of the system 10
9. Plug the OEM connector into its mating connector in the vehicle; and
10. Reconnect the battery of the motor vehicle 12 and check the system 10 for faults.

The wire management sub-system discussed above can also be utilized in applications where a non-OEM seat is used as the seat 14.

The foregoing description is provided for the purpose of explanation and is not to be construed as limiting the invention. Although the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, can make numerous modifications to the invention as described herein, and changes may be made without departing from the scope and spirit of the invention as defined by the appended claims.

What is claimed is:
1. A seating system, comprising:
a frame mountable on a mounting surface within a motor vehicle and comprising a first and a second gear rack;
a carriage assembly mounted on the frame and translating linearly in relation to the frame, the carriage assembly comprising: a first motor coupled to the first gear rack so that the carriage assembly translates in relation to the frame when the first motor is activated, and a first and a second side plate; a plurality of bearings mounted on the first and second side plates and positioned in part within channels formed in the frame so that the carriage assembly translates in relation to the frame on the bearings; a bearing plate having the first motor mounted thereon; a first gearbox mounted on the bearing plate, the first gearbox being coupled to the first gear rack and the first motor so that torque generated by the first motor is transmitted to the first gear rack by way of the first gearbox; a bearing shaft mounted on the bearing plate; and a bearing assembly mounted on the bearing shaft;
a base assembly mounted on the carriage assembly and rotating in relation to the carriage assembly, the base assembly comprising: a second and a third motor, a second gearbox, the second motor being coupled to the second gearbox and the second gear rack so that the base assembly rotates in relation to the carriage assembly when the second motor is activated and torque generated by the second motor is transmitted to the second gear rack by way of the second gearbox; a base pan having the second and third motors and the second gearbox mounted thereon and being coupled to the bearing shaft of the carriage assembly by way of the bearing assembly so that the base pan can rotate in relation to the carriage assembly;
a trolley assembly mounted on the base assembly and translating linearly in relation to the base assembly, the trolley assembly comprising: a third and a fourth gear rack, the third motor being coupled to the third gear rack so that the trolley assembly translates in relation to the carriage assembly when the third motor is activated; a first and a second rail secured to opposite sides of the base pan; and a trolley plate assembly comprising a first and a second plate and a cross brace positioned between and secured to the first and second plates, the trolley plate assembly being mounted on and translating linearly in relation to the first and second rails;
a seat mounted on the third and the fourth rails of the trolley assembly; and
a drive shaft mounted on the base pan so that the drive shaft can rotate in relation to the base pan, the drive shaft being coupled to the third motor and the third and fourth gear racks so that torque generated by the third motor is transmitted to the third and fourth gear racks by way of the drive shaft.

2. The system of claim 1, wherein the trolley assembly translates horizontally and vertically in relation to the base assembly when the frame is mounted on the mounting surface and the mounting surface has a substantially horizontal orientation.

3. The system of claim 1, wherein the seat translates in a first direction between a first position and a second position in response to the linear translation of the carriage assembly in relation to the frame; and the seat translates in a second direction between the second position and a third position in response to the linear translation of the trolley assembly in relation to the base assembly.

4. The system of claim 3, wherein the seat rotates between a first and a second orientation in response to the rotation of the base assembly in relation to the carriage assembly.

5. The system of claim 4, wherein the first orientation faces toward or away from the first direction, and the second orientation faces toward the second direction.

6. The system of claim 4, wherein the seat can translate in the first direction when the seat is located in the third position, in response to the linear translation of the carriage assembly in relation to the frame.

7. The system of claim 4, wherein the seat can translate in a vertical direction when the seat is located in the third position, in response to the linear translation of the trolley assembly in relation to the base assembly.

8. The system of claim 4, further comprising a controller for controlling the movement of the seat between the first and third positions.

9. The system of claim 8, wherein the controller directs the seat along a pre-programmed path between the first and third positions.

10. The system of claim 9, wherein the controller is capable of receiving information relating to the pre-programmed path from a computing device or a hand-held control-input device communicatively coupled to the controller.

11. The system of claim 8, wherein first, second, and third motors can be activated simultaneously to cause the seat to translate along a curvilinear path in relation to the motor vehicle.

12. The system of claim 10, further comprising a plurality of potentiometers and a plurality of limit switches mounted on one or more of the frame, the carriage assembly, the base assembly, and the trolley assembly and communicatively coupled to the controller, wherein the controller determines a position of the chair in relation to the pre-programmed path based on inputs from the potentiometers and the limit switches.

13. The system of claim 1, wherein the third and fourth gear racks are substantially L-shaped.

14. The system of claim 1, wherein:
the first motor is pivotally mounted on the bearing plate, the carriage assembly further comprises a first spring that biases the first motor away from contact with the first gearbox, and a first locking bolt that biases the first motor into contact with the first gearbox; and the first locking bolt can be backed away for the first drive motor so that the first motor disengages from the first gearbox whereby the carriage assembly can be moved manually in relation to the frame; and
the second gearbox is pivotally mounted on the base pan; the base assembly further comprises a spring that biases the second gearbox into contact with the second gear rack, and a locking bolt that biases the second gearbox away from the second gear rack against the bias of the second spring; and the position of the second locking bolt can be adjusted so that the second gearbox disengages from the second gear rack whereby the base assembly can be rotated manually in relation to the carriage assembly.

15. The system of claim 1, further comprising a docking mechanism mounted on the frame and the seat for securing the seat to the frame when the seat is in the first position.

16. The system of claim 8, further comprising means mounted on the frame for routing cabling to at least one of the seat and the controller.

17. A seating system, comprising:
a frame mountable on a mounting surface within a motor vehicle and comprising a first and a second gear rack;
a carriage assembly mounted on the frame and translating linearly in relation to the frame, the carriage assembly comprising a first motor coupled to the first gear rack so that the carriage assembly translates in relation to the frame when the first motor is activated;
a base assembly mounted on the carriage assembly and rotating in relation to the carriage assembly, the base assembly comprising a second and a third motor, the second motor being coupled to the second gear rack so that the base assembly rotates in relation to the carriage assembly when the second motor is activated;
a trolley assembly mounted on the base assembly and translating linearly in relation to the base assembly, the trolley assembly comprising a third gear rack, the third motor being coupled to the third gear rack so that the trolley assembly translates in relation to the carriage assembly when the third motor is activated;
a seat mounted on the trolley assembly, wherein the seat translates in a first direction between a first position and a second position in response to the linear translation of the carriage assembly in relation to the frame; and the seat translates in a second direction between the second position and a third position in response to the linear translation of the trolley assembly in relation to the base assembly; and
a controller for directing the seat along a pre-programmed path between the first and third positions, the controller comprising firmware, and memory storage having information stored thereon representing waypoints defining the pre-programmed path, wherein the controller executes the firmware, and selectively causes the first, second, and/or third motors to be activated and deactivated so as to define the motion of the seat between the first and third position based on the waypoints.

18. The seating system of claim 17, further comprising a software application that, when executed on a computing device communicatively coupled to the controller, causes the computing device to program information representing a path for the seat into the controller when the seat is moved along the path by recording the information representing the path and persisting the information representing the path to the memory storage of the controller.

19. The seating system of claim 18, wherein the software application, when executed on the computing device communicatively coupled to the controller, can program another path for the seat into the controller by causing the computing device to import information representing the other path, and serialize the information representing the other path onto the memory storage of the controller.

20. The seating system of claim 17, wherein the controller, after the seat reaches the third position, further executes the firmware, and selectively causes the first, second, and/or third motors to be activated and deactivated so as to define the motion of the seat in a fore-aft direction and an up-down direction on a simultaneous basis in response to inputs from a user and within a range of movement defined by predetermined foremost, aft-most, top, and bottom positions of the seat.

21. The seating system of claim 20, wherein the controller further executes the firmware, and selectively activates and deactivates the first, second, and/or third motors to cause the seat to automatically return to the third position from a position within the range of movement defined by predetermined foremost, aft-most, top, and bottom position of the seat.

22. A seating system, comprising:
a frame mountable on a mounting surface within a motor vehicle and comprising a first and a second gear rack;
a carriage assembly mounted on the frame and translating linearly in relation to the frame, the carriage assembly comprising a first motor coupled to the first gear rack so that the carriage assembly translates in relation to the frame when the first motor is activated;

a base assembly mounted on the carriage assembly and rotating in relation the carriage assembly, the base assembly comprising a second and a third motor, the second motor being coupled the second gear rack so that the base assembly rotates in relation to the carriage assembly when the second motor is activated;

a seat; and a trolley assembly having the seat mounted thereon, the trolley assembly being mounted on the base assembly and translating linearly in relation to the base assembly, the trolley assembly comprising a third and a fourth substantially L-shaped gear rack, wherein the third motor is coupled to the third gear rack so that the trolley assembly and the seat translate horizontally and vertically in relation to the base assembly due to the substantial L-shape of the third and fourth gear racks when the third motor is activated and the frame is mounted on a mounting surface having a substantially horizontal orientation.

* * * * *